(12) United States Patent
Arnold et al.

(10) Patent No.: US 11,340,760 B2
(45) Date of Patent: May 24, 2022

(54) GENERATING A CUSTOMIZED ORGANIZATIONAL STRUCTURE FOR UPLOADING CONTENT TO A CLOUD-BASED STORAGE SYSTEM

(71) Applicant: Dropbox, Inc., San Francisco, CA (US)

(72) Inventors: Hudson Arnold, San Francisco, CA (US); Kristoffer Mendoza, San Francisco, CA (US); Kristof Didrickson, San Francisco, CA (US); Kyle Shay, Oakland, CA (US)

(73) Assignee: Dropbox, Inc., San Francisco, CA (US)

( * ) Notice: Subject to any disclaimer, the term of this patent is extended or adjusted under 35 U.S.C. 154(b) by 72 days.

(21) Appl. No.: 16/562,952

(22) Filed: Sep. 6, 2019

(65) Prior Publication Data

US 2021/0072870 A1    Mar. 11, 2021

(51) Int. Cl.
```
G06F 3/0482    (2013.01)
G06F 16/13     (2019.01)
G06F 16/182    (2019.01)
G06F 3/0484    (2022.01)
H04L 67/1097   (2022.01)
H04L 67/06     (2022.01)
```
(Continued)

(52) U.S. Cl.
CPC .......... *G06F 3/0482* (2013.01); *G06F 3/0484* (2013.01); *G06F 16/13* (2019.01); *G06F 16/183* (2019.01); *H04L 67/06* (2013.01); *H04L 67/1097* (2013.01); *H04L 67/20* (2013.01); *H04L 67/42* (2013.01)

(58) Field of Classification Search
CPC . G05B 19/409; G06F 3/04812; G06F 3/0482; G06F 17/30289; G06F 9/45533; G06F 17/30073; G06F 15/16; G06F 16/13; G06F 16/183; G06F 3/0484; H04L 63/10; H04L 63/20; H04L 63/102; H04L 67/1097; H04L 67/06; H04L 67/20; H04L 67/42; G06Q 10/0833; H04N 21/41
See application file for complete search history.

(56) References Cited

U.S. PATENT DOCUMENTS 8,539,574 B2    9/2013   Knox
8,769,431 B1 *  7/2014   Prasad ................... G06F 3/048
                                                    715/788

(Continued)

*Primary Examiner* — Steven P Sax
(74) *Attorney, Agent, or Firm* — Keller Preece PLLC

(57) ABSTRACT

Methods, systems, and non-transitory computer readable storage media are disclosed for generating a customized organizational structure prior to uploading content items to a remote storage. For example, in one or more embodiments, the disclosed system identifies a set of content items to host on a remote storage and generates a visual representation of an organizational structure to be used for the content items at the remote storage. The system detects interactions modifying the organizational structure and provides the customized organizational structure to the remote storage prior to transmitting the content items. The system then transmits the set of content items to the remote storage in response to a transmission initiation event, and the remote storage stores the content items according to the customized organizational structure. In one or more embodiments, the system also allows the organizational structure and uploading of content items to be performed using different applications.

20 Claims, 13 Drawing Sheets

(51) Int. Cl.
*H04L 67/53* (2022.01)
*H04L 67/01* (2022.01)

(56) References Cited

U.S. PATENT DOCUMENTS

| | | | |
|---|---|---|---|
| 9,032,288 B2 | 5/2015 | Karlsson | |
| 9,495,070 B2 | 11/2016 | Pennington et al. | |
| 9,497,173 B2 | 11/2016 | Snow et al. | |
| 9,558,401 B2 | 1/2017 | Chajed et al. | |
| 9,942,121 B2 | 4/2018 | Poletto et al. | |
| 9,967,213 B2 | 5/2018 | Huang | |
| 10,235,444 B2 | 3/2019 | Poletto et al. | |
| 10,447,546 B1* | 10/2019 | Guo | G06F 11/301 |
| 2003/0202243 A1 | 10/2003 | Boys et al. | |
| 2004/0044723 A1* | 3/2004 | Bell | H04L 29/06 709/203 |
| 2006/0161635 A1* | 7/2006 | Lamkin | G06F 16/4387 709/217 |
| 2007/0289022 A1* | 12/2007 | Wittkotter | H04L 63/123 726/27 |
| 2008/0033969 A1 | 2/2008 | Koo et al. | |
| 2008/0235289 A1 | 9/2008 | Carnes et al. | |
| 2011/0113122 A1* | 5/2011 | Drope | H04N 21/41407 709/219 |
| 2011/0191343 A1* | 8/2011 | Heaton | G16H 50/70 707/737 |
| 2012/0116983 A1* | 5/2012 | Mak | G06Q 50/163 705/314 |
| 2013/0283232 A1* | 10/2013 | Van Megchelen | G06F 8/41 717/106 |
| 2014/0279596 A1* | 9/2014 | Waris | G06Q 10/0833 705/317 |
| 2015/0074060 A1* | 3/2015 | Varadharajan | G06F 3/04842 707/649 |
| 2015/0172358 A1 | 6/2015 | Huang et al. | |
| 2016/0001187 A1* | 1/2016 | Sepulveda | A63F 13/77 463/31 |
| 2016/0004785 A1 | 1/2016 | Peters et al. | |
| 2016/0353142 A1* | 12/2016 | O'Malley | H04N 21/4348 |
| 2016/0366209 A1* | 12/2016 | Netto | G06F 3/0641 |
| 2017/0171307 A1 | 6/2017 | Xue | |
| 2017/0200122 A1* | 7/2017 | Edson | H04L 63/104 |
| 2018/0113862 A1* | 4/2018 | Glover | G06F 40/197 |
| 2018/0173715 A1* | 6/2018 | Dunne | H04L 67/02 |
| 2018/0299863 A1* | 10/2018 | Caine | H04L 63/102 |
| 2018/0341662 A1* | 11/2018 | He | G06F 16/182 |
| 2019/0043231 A1* | 2/2019 | Uzgin | G06T 11/60 |
| 2020/0073684 A1* | 3/2020 | Shamseddin | G06F 9/453 |
| 2020/0250092 A1* | 8/2020 | Szeredi | G06F 12/0897 |

* cited by examiner

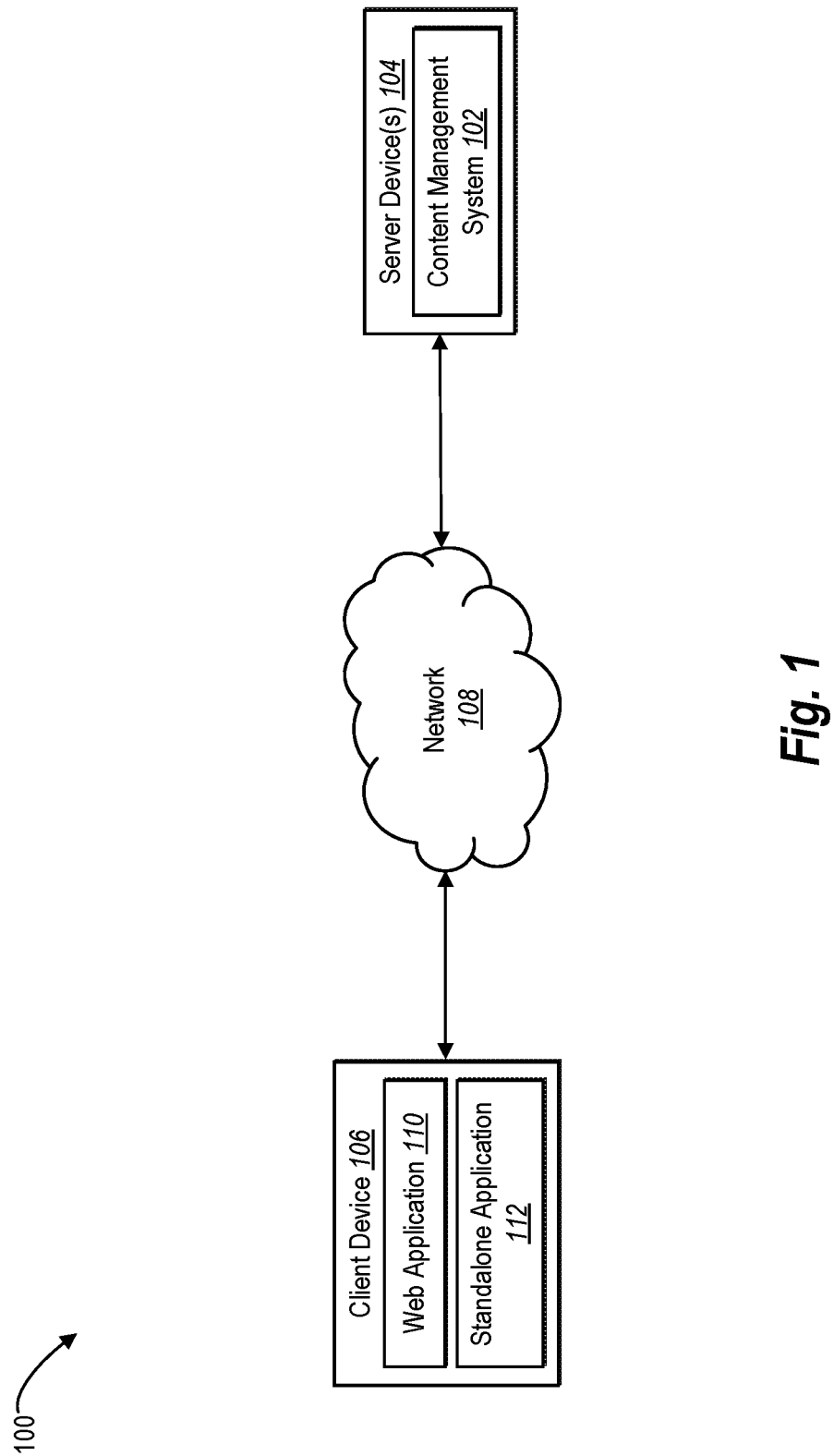

GENERATING A CUSTOMIZED ORGANIZATIONAL STRUCTURE FOR UPLOADING CONTENT TO A CLOUD-BASED STORAGE SYSTEM

BACKGROUND

Determining an organizational structure or arrangement of content items on a remote storage device (e.g., a cloud-based content storage system) is an important part of storing the content items on the remote storage device. Specifically, organizing content items on a remote storage device can allow a user to more easily navigate the content items and find specific content items when accessing the remote storage device. For instance, users often have preferences for how they want content items to be stored for quickly finding the items at a later time, such as by storing related content items together in specifically marked folders, etc. Because content storage systems can store a large number of content items, effectively organizing the content items is important not only for ease of navigation for the user via a graphical user interface, but also for computing efficiency, storage efficiency, and performance of the content storage system.

For example, existing content storage systems typically allow users to select content items stored on a client computing device (e.g., desktop computer or mobile device) to upload to the content storage system. However, these existing content storage systems are unable to provide a graphical user interface to allow a user to navigate and modify the organization of content items within the content storage system until after the content items are uploaded to the content storage system. Indeed, existing content storage systems are unable to provide a user a graphical user interface to organize content items prior to completion of the upload because until the upload is complete, existing content storage systems do not have access to content item details of unreceived content items (e.g., file names, file sizes, etc.) nor have the existing systems defined a storage location within the content storage system until after receiving a content item.

The lack of content item details and the unknown storage location of content items that are yet to be uploaded result in an inefficient multistep graphical user interface and user experience. For instance, in many existing content storage systems, a user has to select files to upload, wait for the files to be uploaded to the content management system, access the files after completion of the upload to the content management system, and then finally organize the files after the content items have been uploaded. Moreover, due to often large uploads of content items (e.g., a large amount of data and/or a large number of content items), this multistep process can take a long time (e.g., ranging from several hours to even days depending on Internet connection speeds and amount of data to upload). Accordingly, existing content storage systems typically have an inefficient multistep graphical user interface and user navigation experience for uploading content items to the content storage system.

The inefficient multistep uploading process discussed above leads to other computing and storage inefficiencies for existing content storage systems. In particular, because existing systems first have to receive content items before allowing a user to organize the files, the result is an increased load on remote storage severs within the content storage system when a user organizes their content. For instance, with existing systems, the content storage system has to initially define the storage location for each received content item. Then, upon a user interacting with uploaded content items to organize the content items, the content storage system redefines storage locations and file hierarchies per user input. Again, because content item uploads can include a large number of content items, a user organizing content items on the content storage system can result in receiving hundreds or more discrete user inputs that results in the content management system executing thousands of instances of instructions based on the user inputs by changing storage locations, file names, creating folders, deleting folders, creating hierarchies, and other user initiated actions to organize content items on the content storage system. Thus, existing storage systems suffer from increased file management loads that result in computational and storage inefficiencies.

Furthermore, many existing systems utilize inflexible web-based applications for uploading content items to the content storage system. For instance, when an upload includes a large amount of data, often a user must end a web-based upload session prior upload completion of content items to the content storage system. Depending on the nature of a particular system, a disrupted upload session can result in uploading errors and thereby reducing the accuracy of an upload. To avoid uploading errors, some existing systems simply restart the entire upload process the next time the user logs in and thereby creating additional inefficiencies by deleting and reuploading previously uploaded items.

Accordingly, a number of disadvantages are present with regard to existing systems for storing content items.

SUMMARY

One or more embodiments disclosed herein provide benefits and/or solve one or more of the foregoing and other problems in the art with systems, methods, and non-transitory computer readable storage media that provide customization of content organizational structure prior to uploading the content to remote storage. For instance, the disclosed system can determine that a user desires to upload a set of content items to remote storage. The disclosed system can generate a visual representation of an organizational structure in which the content items will be stored at the remote storage before the user client device begins transmitting the content items. Additionally, the disclosed system can allow the user to interact with the organizational structure to customize the structure prior to uploading the content items (e.g., by creating folders/sub-folders or moving content items from one folder to another). After customizing the organizational structure, the disclosed system can identify a request to begin transmitting the content items to the remote storage and transmit and store the content items according to the customized organizational structure. The disclosed systems are thus able to provide an improved graphical user interface that allows a user, among other things, to indicate an organizational structure for content items prior to uploading the content items to remote storage device(s), which in turn reduces the number of steps and time needed within a graphical user interface to upload and organize content on the remote storage, and increases computational and storage efficiencies by uploading content items in a preconfigured organization structure.

Additionally, in one or more embodiments, the disclosed system increases system flexibility by uploading content items per the customized organizational structure across a plurality of applications for uploading content to remote storage. In particular, the disclosed system can allow a user to define a structural organization of content items and begin a process of uploading the content items in a web-based application. If the upload of content items is interrupted, the disclosed system can resume uploading the content items at a later time via a standalone client application. For example, the disclosed system can use the previously defined organizational structure provided via the web-based application to continue to upload content and store the content items uploaded via the standalone application. The disclosed system thus results in an increase in upload flexibility and an increase in upload and storage accuracy of content items.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIG. 1 illustrates a schematic diagram of an environment in which a content management system operates in accordance with one or more implementations;

DETAILED DESCRIPTION

Figure 2A:
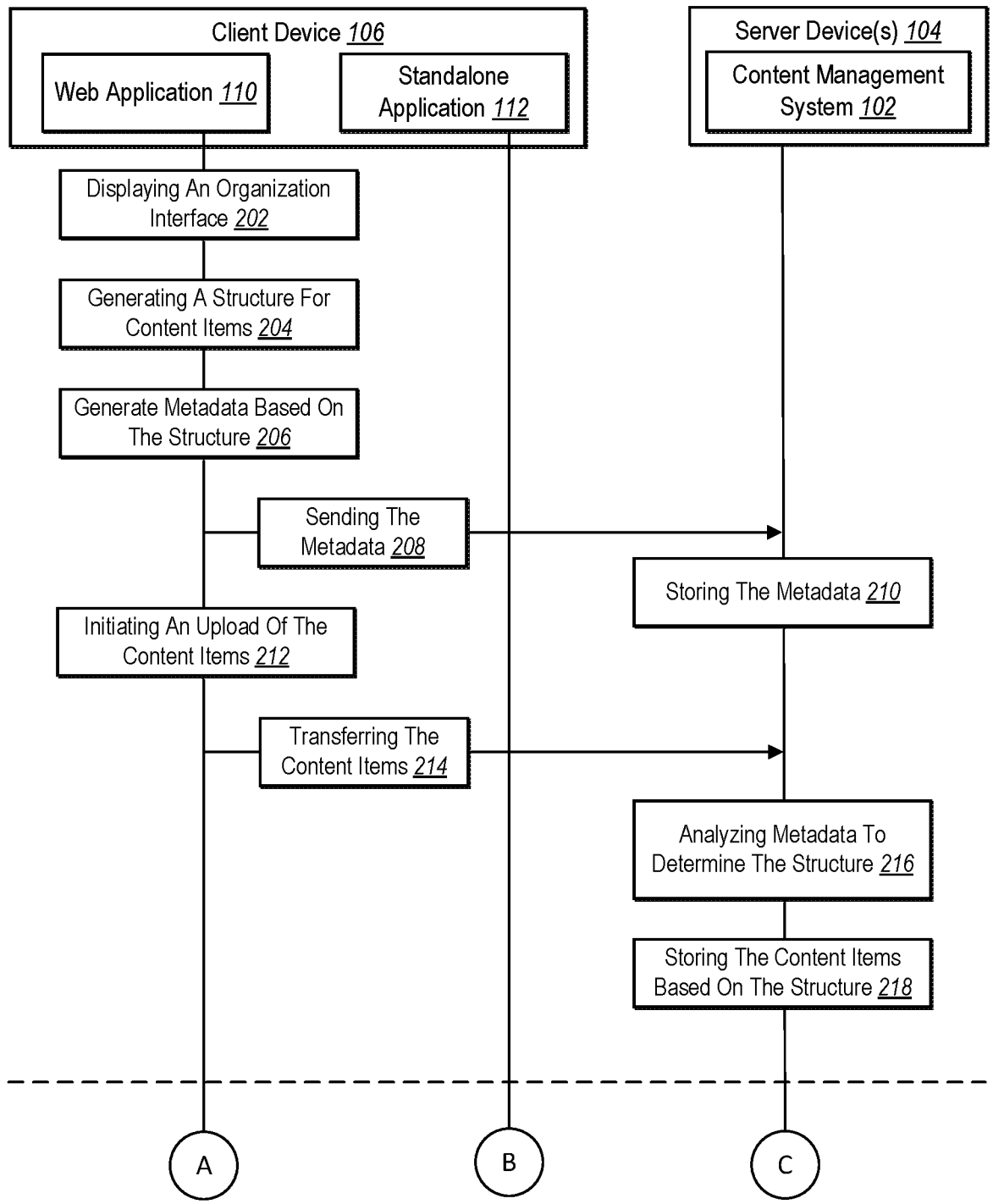
FIGS. 2A-2B illustrate flow diagrams illustrating operations for transferring content items to a content management system with a customized organizational structure in accordance with one or more implementations.

One or more embodiments of the present disclosure include a digital content management system that stores content items according to customized organizational structures provided prior to uploading the content items. In one or more embodiments, the digital content management system (or simply "content management system") receives a user selection of content items to upload to the content management system (e.g., one or more remote storage servers). In response to the user selection, and prior to uploading the content items, the content management system can generate a graphical user interface that provides a visual representation of an organizational structure or storage arrangement of the content items that defines how the content items are stored on the content management system. The content management system can then allow the user to interact with the visual representation to modify the organizational structure (e.g., by creating folders for one or more of the content items or moving representations of the content items) before the upload of any of the selected content items. After a transmission initiation event (e.g., a user selection to upload the content items), the client device of the user can then transmit the content items to the content management system, which stores the content items according to the defined organizational structure.

As mentioned, in one or more embodiments, the content management system allows users to select content items to upload to the content management system. For example, the content management system can include a distributed storage system such as a cloud-based storage system that allows the user to access the content from a number of different devices, for instance, by logging in to a user account with the content management system. In one or more embodiments, prior to uploading the selected content items, the content management system can present a visual representation of an organizational structure of the content items to the user at the user's client device. To illustrate, the content management system can present an interactive user interface that allows the user to indicate which content items the user wants to upload and where the user wants to upload them. More specifically, the content management system can present a default structure for the content items such as by including all of the content items in a flat structure (e.g., no folders/sub-folders) or based on the structure of the files as stored on the client device. The user can then create folders and move content items (or representations of the items) to or from the created folders to establish the customized organizational structure to be used at the content management system.

The content management system can allow the user to begin transmitting the content items at any time during or after establishing the organizational structure of the content items. For instance, the content management system can identify a transmission initiation event to begin transmitting the set of content items from the client device to the content management system. Once the client device has begun transmitting the content items to the content management system, the content management system can store the content items according to the customized organizational structure that the user previously defined within the interactive user interface. In particular, based on the user modifying the organization structure via the visual representation included in the graphical user interface, the content management system can receive metadata from the client device describing the organizational structure prior to initiating transmission of the content items from the client device. Thus, when the user accesses the content items on the content management system from the client device or another device, the content items are displayed according to the customized organizational structure.

Additionally, in one or more embodiments, the content management system can receive user input that causes the system to generate an organizational structure to be used for content items at the content management system using a first application and then upload some or all of the content items using a second application. For example, the content management system can allow the user to generate the organizational structure of the content items, and in some instances begin uploading content, using a web-based application (e.g., a browser displaying a website associated with the content management system). After generating the organizational structure, the content management system can allow the user to initiate or resume the upload using a standalone application (e.g., a desktop or mobile application). Specifically, the content management system can use the organizational structure of the content items previously obtained via the web-based application to store the content items being uploaded later via the standalone application.

As mentioned, the content management system described herein provides advantages over existing systems. In particular, the content management system improves the flexibility of computing devices implementing digital content management. For example, the content management system allows users to provide, to the content management system, arrangements or structures for content to be stored at the content management system before uploading the content. The content management system can thus store information indicating locations of specific content items even before the content items are stored at the content management system. This allows users to upload content items at a later time and even using a different application. In contrast, as mentioned above, existing systems require users to upload content before storing information about the location of the content.

The content management system also provides an improved graphical user interface for users to define the organization of content items to be stored at the content management system. Specifically, by providing a user interface for defining storage locations of content items to be used when storing the content items at the content management system prior to uploading the content items, the content management system reduces the number of steps and the time and effort required to organize the content items. More specifically, the user interface can allow users to generate folders and move content items around within a file/content structure prior to uploading any of the content items and without modifying the locations of the content items at the user's client device.

Furthermore, the content management system improves computing and storage efficiencies of storage devices that implement remote content storage/synchronization. For example, by allowing users to define a structure to be used for content items prior to uploading the content items to the content management system, the content management system can reduce the number of inputs/communications exchanged between the user's device and the content management system. In contrast to existing systems, which cause a client device to send a communication to a storage system each time a user updates a location of an already uploaded content item from a default location to a desired location, the content management system can allow a user device to send an organizational structure to the content management system in a single communication. Also, by retrieving the structure prior to receiving any of the content items, the content management system can store the content items at the desired locations upon receiving the content items. Thus, the content management system reduces processing loads on server devices that store the content items according to the received organizational structure.

Additionally, the content management system provides accurate storage of content items when transitioning between separate applications for uploading the content items to the content management system. In particular, by allowing a user to establish a customized organizational structure to be used for content at the content management system prior to uploading the content, the content management system can allow the user to delay or interrupt the upload at any time and accurately retain the same structure when uploading later. Additionally, this allows the user to start the upload using a first application and then resume the upload using a second application while accurately storing the content according to the previously defined organizational structure.

Additional detail will now be provided regarding the content management system in relation to illustrative figures portraying exemplary embodiments. To illustrate, FIG. 1 includes an example embodiment of an environment 100, in which a content management system 102 can operate. In particular, the environment 100 includes server device(s) 104 and a client device 106 (including a web application 110 and a standalone application 112) in communication via a network 108. In one or more embodiments, the content management system 102 allows a user of the client device 106 to receive and store content items from the client device 106 at the content management system 102. Specifically, the content management system 102 can allow the user to store content items at the content management system 102 to access at a later time via the client device 106 or another client device. As used herein, the terms "content" and "content item" refer to any digital data storable on a computing device. For example, content items can include documents, spreadsheets, collaborative content items, text files, audio files, image files, video files, webpages, executable files, binary files, placeholder files (e.g., shortcut files) referencing other content items stored on the content management system 102, etc. In some embodiments, content items can include placeholder files that reference content items stored on a third-party content management system, for example, by including their URL addresses. In some implementations, a content item can be a portion of another content item, such as an image that is included in a document. Content items can also include collections, such as folders, namespaces, playlists, albums, etc., that group other content items together.

In one or more embodiments, the content management system 102 can include, or be part of, a distributed system or cloud-based storage system that allows users to store data remotely and access the data from any number of devices. To illustrate, the user can log in to an account associated with the content management system 102 via the web application 110 on the client device 106 and select content items to store at the content management system. When the user logs in to the content management system 102 using any other client device, the content management system 102 can synchronize the user's stored data with the other client device(s) by communicating with the client device(s) via the network 108. In one or more additional embodiments, the content management system 102 can be implemented in a single computing device (e.g., a single server device) or partially on the server device(s) 104 and partially on the client device 106.

As used herein, the term "web application" refers to a computing application that accesses a remote device via a network. For example, a web application can include an internet browser with a web-based online interface such as a website. As used herein, the term "standalone application" refers to an application that is specific for content management. For example, a standalone application can include an application that only connects to the content management system 102 to allow users to upload and access content items at the content management system 102. Additionally, a standalone application can include a standalone application interface such as a desktop application or a mobile application.

Additionally, as part of allowing users to upload content to the content management system 102, the content management system 102 allows users to define customized organizational structures to be used for the content stored on the content management system 102. As used herein, the terms "organizational structure" and "structure" refer to a storage arrangement of digital content items on a storage device. For example, an organizational structure can include respective locations of content items on a storage device, including whether each content item is stored in a folder or sub-folder. The organizational structure can also include the location of each folder and sub-folder. In one or more embodiments, an organizational structure can include file paths, URLs, or other pointers/locators indicating a storage location or folder hierarchy on the server device(s) 104.

As mentioned, the content management system 102 can provide a visual representation of an organizational structure to the client device 106 for display on a display device. As used herein, the term "visual representation" refers to a digital layout of an organizational structure of content items to be used for storing the content items after transferring the content items from one device to another device. For example, a visual representation can include a file hierarchy of placeholder icons displayed within a user interface on a display device in which the placeholder icons represent (e.g., point to) content items currently stored on a client device and which will be uploaded to the content management system. Additionally, modifying the location of placeholder icons changes the visual representation without modifying the content items on the client device. Accordingly, the user can interact with the visual representation via the web application 110 on the client device 106 to customize the organizational structure of the content items. The client device 106 can then send the customized structure to the content management system 102 for use in storing the content items after the content items are transmitted. After receiving the customized structure from the client device 106, the content management system 102 can then receive and store the content items according to the customized structure once the client device 106 begins transmitting the content items to the content management system 102 using the web application 110 or the standalone application 112.

According to one or more embodiments, the client device 106 includes a computing device that allows a user to interact with the visual representation of content items within the visual representation of the organizational structure. For example, the client device 106 can include a desktop computing device or a mobile computing device (e.g., smartphone, tablet, laptop). To illustrate, the client device 106 can allow the user to capture, create, modify, and/or store content items to one or more storage devices on client device 106 and/or on the content management system 102. The client device 106 also allows the user to move content items from one storage location to another storage location according to content item storage processes described herein. Additional detail for the client device 106 and for other computing devices is described in more detail below with respect to FIG. 9.

Figure 2B:
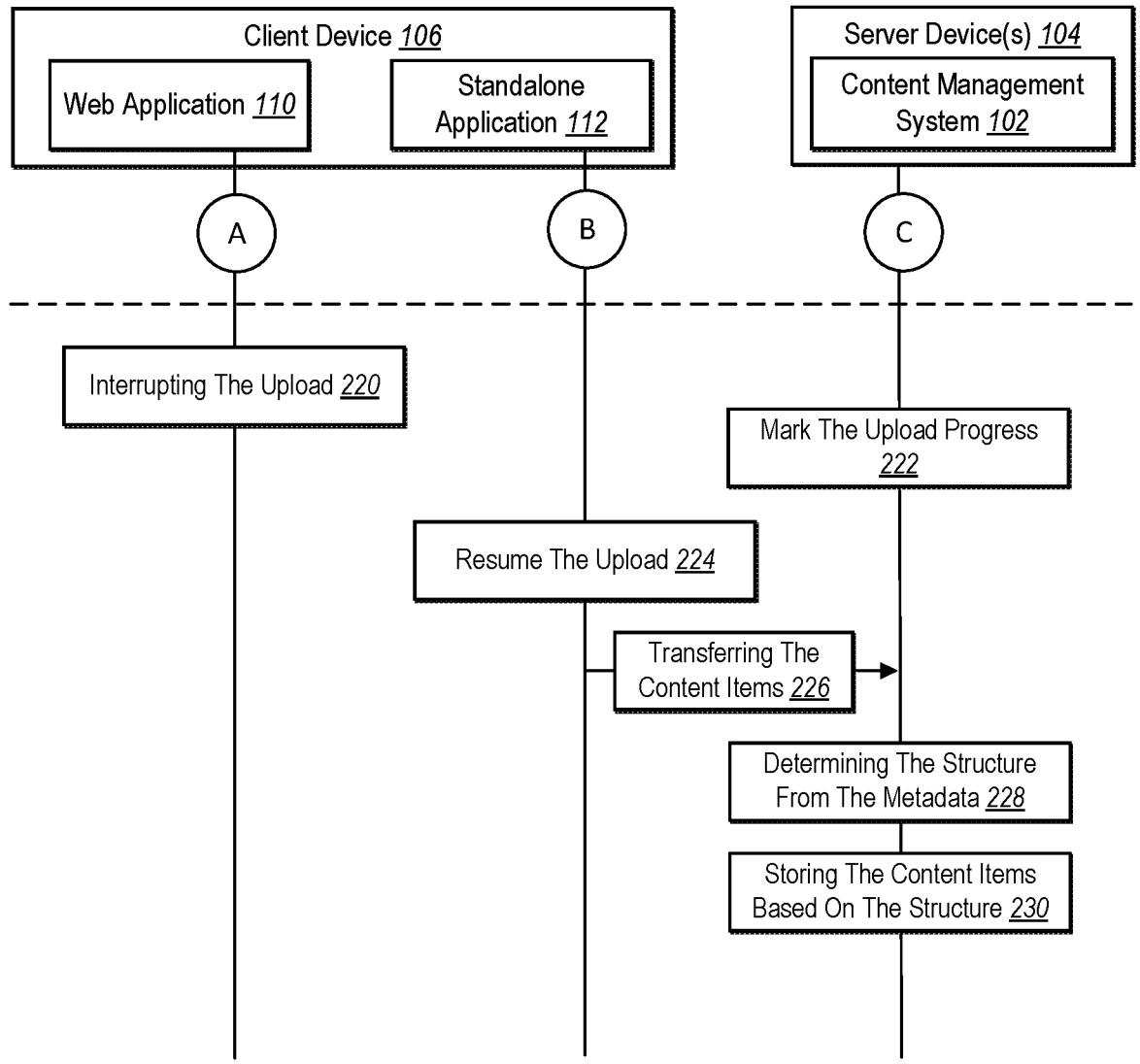

As mentioned, the content management system 102 can generate a customized organizational structure to be used for content items prior to transmitting the content items from a client device of the user to the content management system 102. FIGS. 2A-2B illustrate example flowcharts of operations in a process for generating a customized organizational structure for content to be transmitted to, and used by, the content management system 102. In particular, FIGS. 2A-2B illustrate a series of acts that the content management system 102 at the server device(s) 104 and the web application 110 and/or standalone application 112 at the client device 106 can perform as part of the process for generating and using a customized organizational structure.

In one or more embodiments, the series of acts of FIG. 2A includes an act 202 of displaying an organization interface by which a user can view a current structure of content items. For example, the user can utilize the web application 110 on the client device 106 to view a graphical user interface that allows a user to indicate one or more content items stored on the client device 106 that the user wants to upload to the content management system 102. In one or more additional embodiments, the user can select content items that are stored on another device (e.g., an external drive or accessible from an online source, such as a third-party content management system accessible by the user). As the user selects content items, the web application 110 can display a visual representation of the selected content items within a graphical user interface without any of the content items having been transmitted to the content management system 102.

As further shown in FIG. 2A, the series of acts can include an act 204 of generating a structure for selected content items. In one or more embodiments, the content management system 102 can generate a default structure for selected content items by displaying the content items based on an organizational structure of the content items as selected. According to one or more embodiments, the content management system 102 can provide a website within the web application 110 that runs on the client device 106 and has access to a local storage of the client device 106. The content management system 102 can thus cause the web application 110 to initially display the content items with the same file structure as stored on the client device 106, including folders/directories and nested sub-folders. Alternatively, the web application 110 can initially display the content items in a flat structure (e.g., without the use of any folders or nested folders).

Figure 3A:
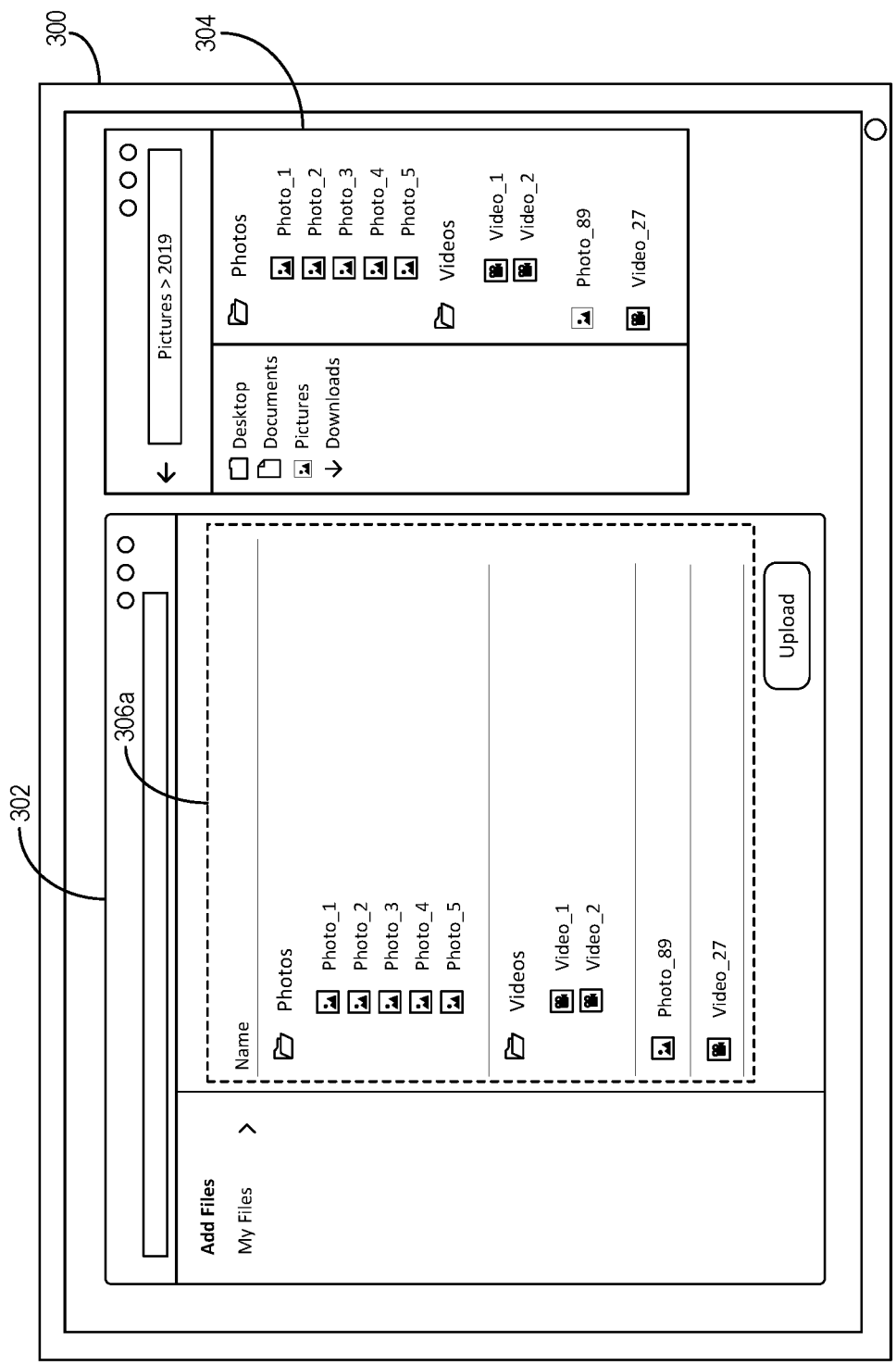
FIGS. 3A-3B illustrate example graphical user interfaces for creating a customized organizational structure for content items at a content management system in accordance with one or more implementations.
Figure 3B:
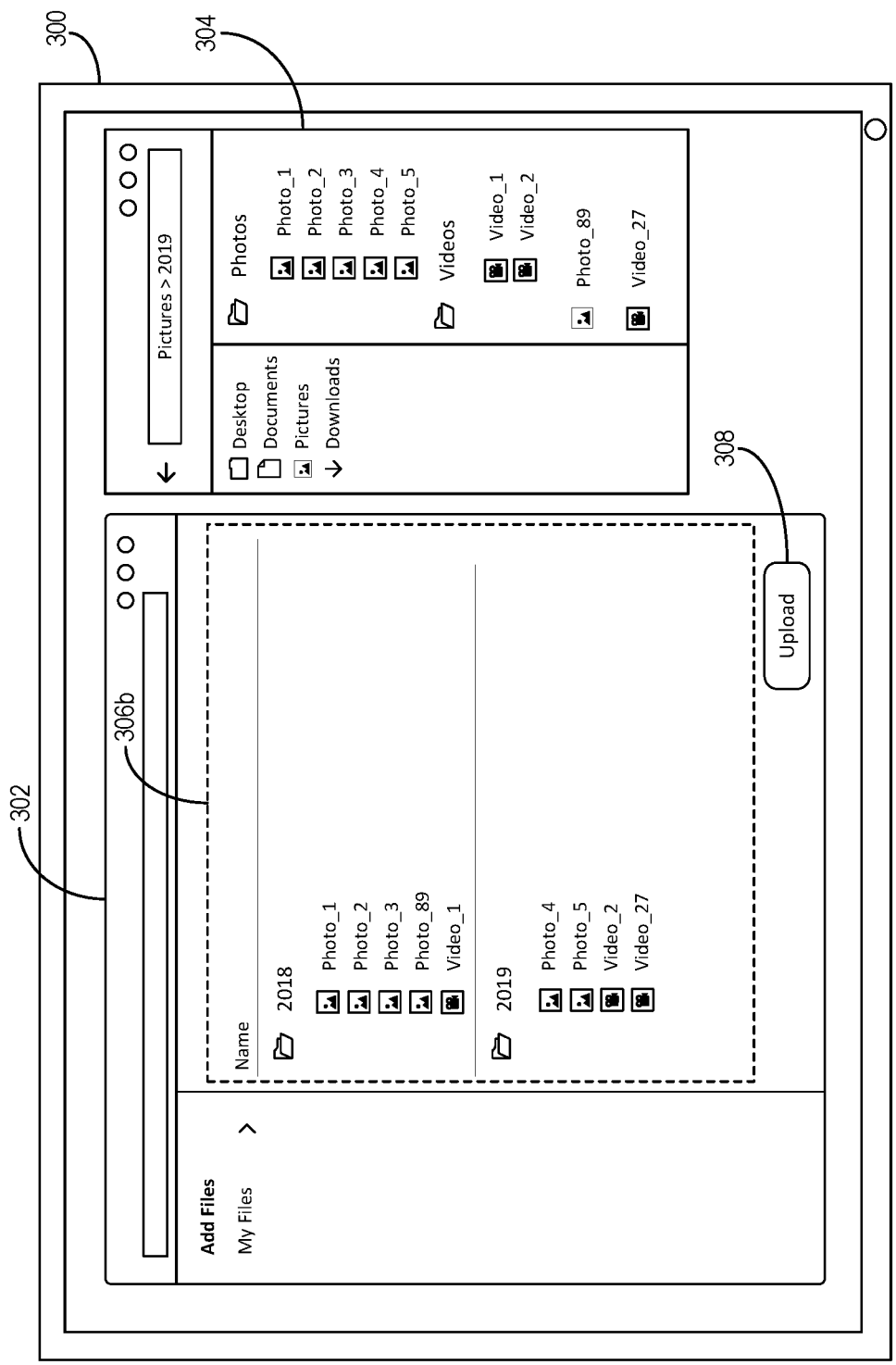

The content management system 102 can then allow a user to modify the organizational structure via the web application 110. For example, the web application 110 can include an interactive interface that allows the user to reposition content items within the organizational structure. Additionally, the interactive interface can allow the user to add/remove content items or add/remove folders within the organizational structure to create a customized organizational structure for the content items. FIGS. 3A-3B illustrate details of various embodiments of a graphical user interface for customizing an organizational structure to be used for content items at the content management system 102 as will be discussed below.

As mentioned previously, as the user interacts with the interactive interface to modify the organizational structure, the content management system 102 can modify placeholder icons representing the content items without modifying the content items at the client device 106 (e.g., without modifying the storage structure of the content items within a storage device of the client device 106). For example, changing a position of a content item within the interactive interface displaying the organizational structure can update the position of a placeholder icon corresponding to the content item within the interactive interface (i.e., in the visual representation of the organizational structure) without changing the location of the content item on the client device

106. Similarly, creating or deleting folders in the interactive interface causes the content management system 102 to create or delete placeholder icons representing the folders within the interactive interface without adding or removing folders at the client device 106. In addition, when adding content items from a third-party content management system, the content management system 102 can modify placeholder icons representing content items on the third-party content management system without modifying the storage structure of the content items within the third-party content management system.

In response to the user generating a customized organizational structure, FIG. 2A can include an act 206 of generating metadata based on the customized structure. For example, the content management system 102 can cause the client device 106 (e.g., via the web application 110) to generate a metadata file that includes data representing the organizational structure of the content items. To illustrate, a website associated with the content management system 102 can include coding that causes the client device 106 to generate the metadata file according to the customized organizational structure. As the user updates the structure by adding, deleting, or moving content items or folders, the client device 106 updates the metadata file. Additionally, the metadata file can include data indicating locations of each content item for the content management system 102 to use in organizing the content items.

After generating the metadata, the series of acts can include an act 208 of sending the metadata to the content management system 102, as shown in FIG. 2A. In one or more embodiments, the client device 106 can send the metadata to the content management system 102 in response to an indication to initiate transmitting the content items to the content management system 102. Alternatively, the client device 106 can send the metadata to the content management system 102 in response to a modification to the organizational structure (e.g., a moved, added, or deleted content item or folder). In another example, the client device 106 can send the metadata to the content management system 102 after set time increments (e.g., every 30 seconds or every minute).

FIG. 2A illustrates that the series of acts can then include an act 210 of storing the metadata corresponding to the organizational structure of the content items. In particular, the content management system 102 can store a metadata file received from the client device 106 defining the organizational structure of content items that will be uploaded to the content management system 102. More specifically, the content management system 102 can, in some embodiments, receive and store the metadata prior to initiating the transmission of content items from the client device 106 to the content management system 102. In one or more alternative embodiments, the content management system 102 can receive and store the metadata in parallel with receiving and storing the content items (or in parallel with receiving and storing at least some of the content items). In one or more embodiments, the content management system 102 can store the metadata in association with a user account of the user associated with the client device 106 based on the user logging in to the user account via the web application 110.

FIG. 2A further shows that the series of acts can include an act 212 of initiating an upload of the content items after generating and providing the customized organizational structure to the content management system. In one or more embodiments, the content management system 102 can allow the user to select an option to initiate a transmission of the selected content items for storing at the content management system 102. For example, the user can select the option to begin a transmission initiation event at any time during (or after) a process of generating an organizational structure to be used for the content items at the content management system 102. To illustrate, the user can select the option to begin a transmission initiation event after generating a customized organizational structure.

After the user triggers the transmission initiation event, the series of acts can include an act 214 of transferring the content items. Specifically, the web application 110 can cause the client device 106 to send the content items to the content management system 102 via a network. In one or more embodiments, the client device 106 can queue the content items for transferring to the content management system 102 while the web application 110 is open/running on the client device 106. For instance, the client device 106 can send content items stored on the client device 106 (or an attached storage device) to the content management system 102.

Furthermore, as previously mentioned, a user can select content items that are stored on another device or system. To illustrate, the user can select one or more content items that are stored at an internet-based location identified by a uniform resource locator ("URL"). Thus, the content management system 102 can obtain selected content items from a third-party content management system. In some embodiments, the content management system 102 can access the third-party system (e.g., by providing third-party system credentials provided to the content management system 102 by the user) and receive the content items from the third party directly. In other embodiments, the content items stored on the third-party system can be first downloaded to the client device 106 and then sent by the client device 106 to the content management system 102. In some embodiments, the content management system 102 can obtain a combination of content items stored on the client device 106 and content items stored at an internet-based location based on content items the user has selected.

As the content management system 102 receives the content items from the client device 106, the content management system 102 can begin storing the content items in connection with a user account of the user. For example, as shown, the series of acts of FIG. 2A can include an act 216 of analyzing metadata to determine the organizational structure of the content items. In particular, the content management system 102 can cause the web application 110 to access the contents of a metadata file corresponding to the organizational structure of the content items to determine the specific content items and the locations on the client device 106.

FIG. 2A illustrates that the series of acts can then include an act 218 of storing the content items based on the structure from the metadata. Specifically, because the content management system 102 has already received a detailed description of the customized organizational structure from the client device 106, the content management system 102 can store each content item according to a destination location determined based on the organizational structure. For instance, the content management system 102 can store content items in a root folder or a sub-folder based on an indication of the storage location in the metadata received from the client device 106. Thus, the content management system 102 does not require the content items to be stored at the content management system 102 before allowing the user to customize locations of the content items as stored at the content management system 102.

As illustrated in FIG. 2A, the content management system 102 can allow a user to customize an organizational structure for use in storing content items at the content management system 102. Specifically, the user can customize the organizational structure prior to selecting an option to upload the content items to the content management system 102. In one or more alternative embodiments, the user can select the option while generating the customized organizational structure. In additional embodiments, the user can select the option prior to generating the customized organizational structure such that the content management system 102 begins storing the content items according to a default organizational structure. The user can then customize the organizational structure (e.g., using the web application 110), and the content management system 102 can then update the storage of the content items based on the customized organizational structure after receiving the metadata from the client device 106. According to one or more embodiments, the user can update the organizational structure in an offline mode such that the client device 106 can send the metadata corresponding to the updated organizational structure in response to connecting to a network, or the next time the user logs in to a user account associated with the content management system 102.

As described in relation to FIG. 2A, the content management system 102 can allow a user to select an option to upload content items via a web-based application (e.g., web application 110). In one or more embodiments, the client device 106 can transmit all of the selected content items during a single sign-on session. Alternatively, the client device 106 may transmit the selected content items in more than one session or using more than one application. For example, FIG. 2B illustrates a flow diagram of a process of interrupting a transmission of content using a first application and resuming the transmission of content using a second application.

In particular, as shown in FIG. 2B, a series of acts for interrupting and resuming an upload of content can include an act 220 of interrupting the upload of content items from a client device 106 to a content management system 102. In particular, the client device 106 may stop transmitting content items to the content management system 102 for a variety of reasons. For example, the client device 106 may stop transmitting content items in response to losing a communications connection to the content management system 102 (e.g., lost network connection). In one or more embodiments, a user can manually interrupt an upload process by selecting an option to cancel the upload process or by closing an application facilitating the upload process (e.g., the web application 110).

In one or more embodiments, as shown, a user may begin an upload process to upload a plurality of content items. The user can interrupt the process after uploading the organizational structure or after uploading one or more of the individual content items (and prior to uploading all of the indicated content items). Accordingly, the entirety of the upload process can include operations for uploading the organizational structure and then uploading one or more of the content items.

In one or more embodiments, some client applications include security protocols that prohibit pausing and resuming of uploads to remote storage devices. For example, some web applications may prevent a user from pausing upload processes initiated within the web applications. In such cases, the user may begin uploading selected content items within the standalone application 112 after defining the organizational structure via the web application 110 and then pause and resume the upload process at any time from within the standalone application 112.

Additionally, the content management system 102 may automatically interrupt the upload process based on a setting associated with a corresponding application or capabilities of the corresponding application. For example, a user may establish a setting to pause or stop the upload process after a specific amount of time. Furthermore, the web application 110 may determine that one or more of the files has a file type or a file size that is incompatible with an upload process via the web application 110. In response to detecting such a setting or incompatibility, the content management system 102 may notify the client device 106, and the client device 106 can then pause or stop the upload process.

In one or more embodiments, the series of acts includes an act 222 of marking the upload progress in response to interrupting the upload, as in FIG. 2B. In particular, in response to detecting an interruption of an upload process, the content management system 102 can store a record of content items that were transferred during the upload process prior to the interruption. To illustrate, the content management system 102 can store the record of content items already transferred in a table or database including identifiers and source locations of the content items. This can allow the content management system 102 to resume the upload process without re-transmitting content items that the content management system 102 already stored.

The series of acts can then include an act 224 of resuming the upload of content items. Specifically, FIG. 2B illustrates that the content management system 102 can allow the user to resume a previously interrupted upload of content items using a different application. For instance, the content management system 102 can allow the user to resume the upload using a standalone application 112 associated with the content management system 102. To illustrate, as mentioned, the standalone application 112 can include a desktop application or a mobile application that allows a user to log in to a user account associated with the content management system 102.

In one or more embodiments, when the user logs in to the user account via the standalone application 112 after delaying or interrupting an upload of content items, the content management system 102 can notify the user via the standalone application 112 that the previous upload was delayed/interrupted. The user can choose to resume the upload via the standalone application 112, or the standalone application 112 can automatically resume the upload. Alternatively, as described in more detail with respect to FIGS. 5A-5B, the content management system 102 can provide a notification to the user via the web application 110 that the user can begin or resume a content upload via the standalone application 112. The user can then select an option to cause the client device 106 to open (or switch to) the standalone application 112 and begin/resume the upload via the standalone application 112.

The series of acts in FIG. 2B can also include an act 226 of transferring the content items to the content management system 102. Specifically, the content management system 102 can resume the upload by transferring content items that the content management system 102 has not already stored. For example, the content management system 102 can access the record of stored content items to determine which content items remain and then send a message to the client device 106 indicating the remaining items. The client device 106 (e.g., via the standalone application 112) can then transfer the remaining content items to the content management system 102.

Furthermore, as shown in FIG. 2B, the series of acts can include an act 228 of determining the structure from the metadata. For example, the content management system 102 can access the previously stored metadata based on the generated structure from the web application 110. The content management system 102 can determine the storage location of each remaining content item from the stored metadata. After determining the structure from the previously stored metadata, the series of acts in FIG. 2B can also include an act 230 of storing the content items based on the structure. Accordingly, the content management system 102 can store a plurality of content items according to a customized organizational structure regardless of whether a user utilizes a single application or separate applications for generating the customized organizational structure and uploading the content items. Furthermore, the content management system 102 can store content items using the same customized organizational structure after interrupting and then resuming an upload process across a plurality of applications by using metadata describing the organizational structure.

Although FIGS. 2A-2B illustrate a user defining a customized organizational structure via a web application 110, the content management system 102 can allow users to define customized organizational structures using the stand-alone application 112. For example, the standalone application 112 can include an interactive user interface that allows the user to add, move, or remove content items and folders according to the user's preferences. Additionally, because the content management system 102 can store a metadata file including metadata that represents a customized organizational structure, the content management system 102 can allow a user to define at least a portion of an organizational structure using a first application and at least a portion of the organizational structure using a second application. In the case of content items not stored at a client device of the user (e.g., items stored at an internet-based location such as a third-party content management system), the content management system 102 can also allow a user to define the organizational structure for the content items across any number of devices. Furthermore, in the case of content items stored at a remote third-party content management system, the content management system 102 can allow the user to define the organizational structure without modifying the storage structure of content items within the remote third-party content management system.

As mentioned, FIGS. 3A-3B illustrate example graphical user interfaces for generating a customized organizational structure to be used for content items when the content items are stored at the content management system 102. In particular, FIG. 3A illustrates an initial organizational structure for a selected set of content items. FIG. 3B illustrates a customized organizational structure for the selected set of content items after the user has modified the initial organizational structure.

In one or more embodiments, as illustrated in FIG. 3A, a client device 300 can include a client application 302 that displays content items selected by a user of the client device 300. For example, the client device 300 can include the client device 106 of FIG. 1, and the client application 302 can include a web application (e.g., web application 110 of FIG. 1) that displays content associated with the content management system 102 that is accessible via an internet connection. To illustrate, a user of the client device 300 can access a website associated with the content management system 102 by entering a URL of the website into a navigation bar or otherwise navigating to the website via the web application. The user can then log in to a user account associated with the content management system 102 by providing login credentials via the client application 302.

In response to the user logging in to the user account, the content management system 102 can provide a user interface that displays data associated with the user account. Specifically, the client application 302 can display a user interface for synchronizing or storing content items with the content management system 102. For example, the client application 302 can allow the user to interact with the user interface to insert selected content items (e.g., placeholder icons representing the selected content items) into the user interface.

FIG. 3A also illustrates a file manager application 304 that displays content items stored on the client device 300. The file manager application 304 and the client application 302 can be separate applications, or different modules of the same application. The file manager application 304 can display content items stored on the client device 300 according to a file hierarchy or other organizational structure of the content items on the client device 300. For instance, the file manager application 304 can display folders, sub-folders, and content items within each folder/sub-folder according to storage locations within an operating system on the client device 300. The user can thus navigate digital storage at the client device 300 to find content items that the user wants to store at the content management system 102.

As mentioned previously, in addition to displaying content items stored on the client device 300, the file manager application 304 can display content items stored on a remote third-party content management system according to a file hierarchy or other organizational structure of the content items on the third-party content management system. For instance, the file manager application 304 can display folders, sub-folders, and content items within each folder/sub-folder according to storage locations within the third-party content management system. The user can thus navigate digital storage of the third-party content management system to find content items that the user wants to store at the content management system 102. In some embodiments, the file manager application 304 can simultaneously display and allow the user to select from content items stored on the client device 300 as well as content items stored on the third-party content management system, either in the same window or in two or more separate windows. In other embodiments, the file manager application 304 can display only content items stored on the client device 300 or only content items on the third-party content management system.

In one or more embodiments, the content management system 102 can allow the user to move content items into the user interface of the client application 302 via a drag-and-drop interaction. To illustrate, the user can highlight one or more content items in the file manager application 304 and then drag the highlighted content item(s) onto the user interface of the client application 302. Alternatively, rather than using a drag-and-drop interaction with the file manager application 304, the content management system 102 can allow the user to select content items to store with the content management system 102 via a file browser dialog that opens in the user interface of the client application 302.

According to one or more embodiments, the content management system 102 can display selected content items within the user interface of the client application 302 according to an initial organizational structure 306a. In particular, as mentioned previously, the content management system 102 can initially display the selected content items based on a file hierarchy of the content items at the client device 300.

For instance, an initial organizational structure 306a can include the file hierarchy of a set of content items when the user adds the set of content items within the client application 302, including any folders or sub-folders and the relative locations of the content items. Thus, if the user selects a folder and its contents within the file manager application 304 to include in the selected content items, the content management system 102 can include the folder and its contents as stored in the initial organizational structure 306a (e.g., with the same hierarchy).

In one or more embodiments, as the user adds content items to the selected contents by navigating the digital storage of the client device 300 within the file manager application 304, the content management system 102 can build the organizational structure according to the added content items. For example, a user can add a first group of content items from a first section of the digital storage at the client device 300 and a second group of content items from a second section of the digital storage at the client device 300. Based on the user selecting the first and second groups of content items, the organizational structure displayed within the client application 302 can include an initial organizational structure corresponding to the first section. Adding the second groups of content items can then modify the initial organizational structure based on the structure of the second section.

As mentioned, a user may desire to customize an organizational structure by moving one or more content items and/or creating or deleting one or more folders within the organizational structure. FIG. 3B illustrates a customized organizational structure 306b for the selected content items of FIG. 3A. In particular, the content management system 102 can allow the user to modify the initial organizational structure 306a by interacting with the content items and/or folders within the user interface of the client application 302. To illustrate, the user can select one or more content items within the user interface such as by clicking or tapping on the icon(s) representing the content item(s). The user can then move the content item(s) to another location within the organizational structure, for example, by dragging the content item(s) to the destination location. For instance, the user can move a content item from a first folder in the organizational structure to a second folder in the organizational structure.

Furthermore, the content management system 102 can allow the user to create new folders in the customized organizational structure 306b. Specifically, the user can create and name a new folder in a root folder of the customized organizational structure 306b or as a sub-folder within another folder of the customized organizational structure 306b. Additionally, similar to moving content items, the user can move a folder from one section of the customized organizational structure 306b to another section by selecting and dragging the folder to a new location. Moving a folder also causes the contents of the moved folder to move to the new location.

In one or more embodiments, the content management system 102 can provide suggestions for the customized organizational structure 306b. For instance, the content management system 102 can analyze the content items (e.g., the types of content items), user preferences, and previous user actions to determine one or more suggestions. To illustrate, the content management system 102 can use machine-learning or other analysis to determine one or more suggestions of hierarchies, content groupings, filenames, folder names, or other organizational structure characteristics to provide to the user. In one or more embodiments, the content management system 102 can even use machine-learning to automatically create and store a customized organizational structure to apply to the selected content items prior to uploading the content items.

In one or more embodiments, the content management system 102 can store metadata representing the organizational structure for the content items in a metadata file on the client device 300. In particular, content management system 102 can store the metadata file at the client device 300 as the user customizes the organizational structure. To illustrate, the content management system 102 can generate and update metadata representing the hierarchy and locations of folders and content items in response to the user moving folders and/or content items from the initial organizational structure 306a to create the customized organizational structure 306b.

In at least some embodiments, the content management system 102 can create metadata in response to generating the initial organizational structure 306a. For example, the content management system 102 can create metadata whenever any content items are present within the user interface of the client application 302 (e.g., after the user adds a first content item or first group of content items to the user interface). The content management system 102 can also create or modify metadata to reflect each modification to the organizational structure. Thus, the content management system 102 can update the metadata in response to each added group of one or more content items and for each content item or folder moved within the user interface of the client application 302.

Additionally, the content management system 102 can allow the user to begin uploading the selected content items to the content management system 102. As illustrated in FIG. 3B, the client application 302 can include an upload element 308 that causes a transmission initiation event to occur. In particular, the upload element 308 can cause the client device 300 to begin transmitting the selected content items to the content management system 102 so that the content management system 102 can store the transmitted content items according to the organizational structure. The user can select the upload element 308 at any time to begin uploading the currently selected content items. If the user selects additional elements and/or makes modifications to the organizational structure, the client device 300 can send the changes to the content management system 102, which can adjust the previously uploaded content items accordingly.

Figure 4:
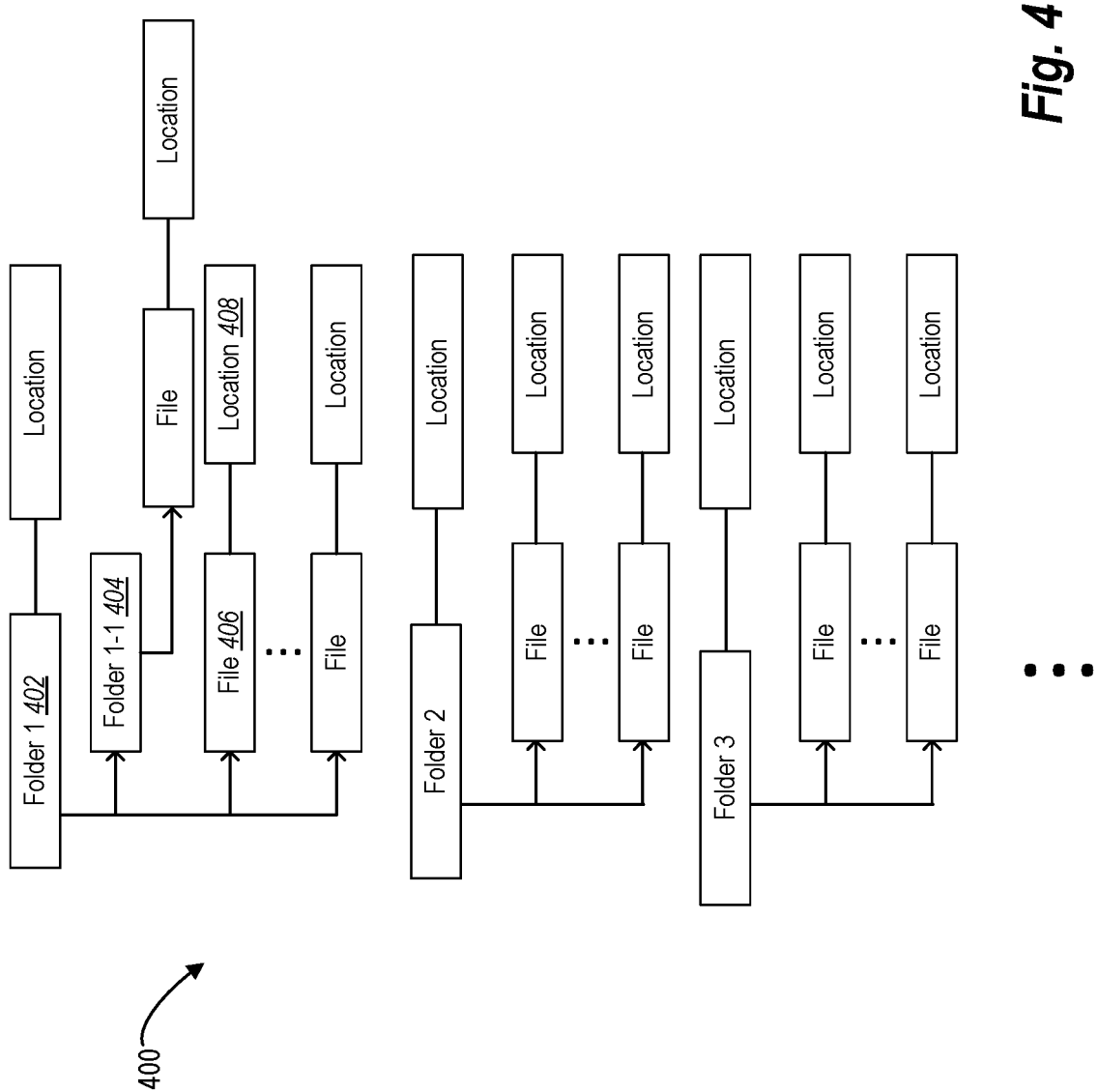
FIG. 4 illustrates a block diagram representing metadata for a customized organizational structure in accordance with one or more implementations.

FIG. 4 illustrates an example diagram of a representation of metadata 400 within a metadata 400 file corresponding to an organizational structure of content items to be uploaded to the content management system 102. Specifically, the metadata 400 can include a plurality of nodes arranged according to the organizational structure. For example, the metadata 400 can include nodes representing folders or directories within the organizational structure. Additionally, the metadata 400 can include nodes representing the selected content items.

As shown in FIG. 4, a first node 402 represents a folder within the organizational structure. The first node 402 can include information about the folder such as a folder name (or other identifier) and a position within a folder hierarchy of the organizational structure. To illustrate, the first node 402 can indicate to the content management system 102 that the folder is located within a root node of the content management system 102, such that the folder is not located within a sub-folder. The first node 402 can also include information about contents of the folder, such as pointers or other data linking the content items contained within the folder to the first node 402.

Also as illustrated in FIG. 4, a second node 404 represents a sub-folder contained within the folder corresponding to the first node 402. Specifically, as previously mentioned, the organizational structure can include folders and nested sub-folders within one or more of folders or sub-folders. The metadata 400 can thus include a node for each sub-folder based on the position of the sub-folder within the organizational structure. To illustrate, the second node 404 representing the sub-folder within the folder corresponding to the first node 402 can include data identifying the sub-folder (e.g., a name of the sub-folder) and a position of the sub-folder relative to the folder corresponding to the first node 402 and/or to other nodes. Similar to the first node 402, in one or more embodiments, the second node 404 can also include pointers or other data linking the content items of the sub-folder to the second node 404.

In addition to nodes representing folders of the organizational structure, the metadata 400 can include nodes representing selected content items within the organizational structure. To illustrate, the metadata 400 includes a third node 406 representing a selected content item within the organizational structure. According to one or more embodiments, the third node 406 can include data identifying the content item (e.g., a filename) and a position of the content item within the organizational structure including the position of the content item with the parent folder corresponding to the first node 402.

In one or more embodiments, the content management system 102 can also include data indicating storage locations of the content items and other elements within the organizational structure. For instance, the metadata 400 can include a fourth node 408 representing location data for the content item corresponding to the third node 406. To illustrate, the fourth node 408 can include a file path of the content item on a client device that will transfer the content item to the content management system 102. In embodiments in which the corresponding content item is stored at a third-party content management system, the fourth node 408 can alternatively include an internet-based URL or other pointer to a remote storage device.

FIG. 4 illustrates that the metadata 400 can include nodes for each of the folders, content items, and their respective source locations. In one or more embodiments, the content management system 102 generates metadata as a user selects content items for transmitting to the content management system 102. For instance, the content management system 102 can generate a node for a content item in response to the user adding the content item to a user interface of a client application associated with the content management system 102. The content management system 102 can also generate a node for the location for finding the content item so that the content management system 102 can know where to find the content item during an upload process. Additionally, the content management system 102 can generate metadata in response to a user adding folders to the organizational structure of the selected content items.

In one or more additional embodiments, the content management system 102 can update metadata corresponding to an organizational structure of selected items in response to modifications to the organizational structure. Specifically, the content management system 102 can update metadata after each change to the organizational structure to add or remove content, add or remove folders, or move content/folders from one location to another within the organizational structure. To illustrate, if a user first adds or moves one or more content items/folders after the content management system 102 has generated metadata representing an organizational structure of content items, the content management system 102 can modify the corresponding metadata to reflect the changes. This can allow the content management system 102 to maintain an updated representation of the organizational structure.

Figure 5A:
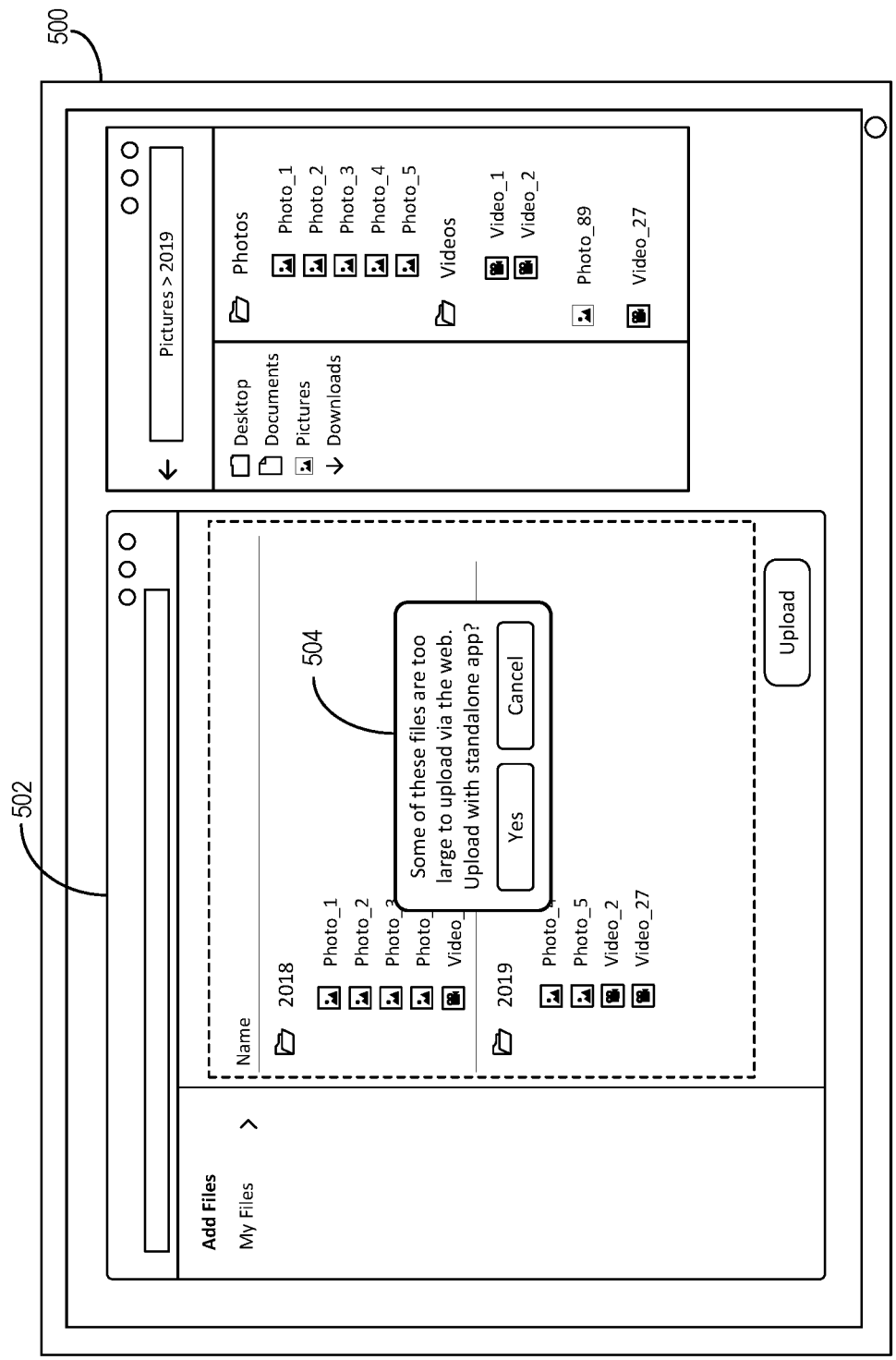
FIGS. 5A-5B illustrate example graphical user interfaces for switching applications for uploading content items to a content management system using a customized organizational structure in accordance with one or more implementations.
Figure 5B:
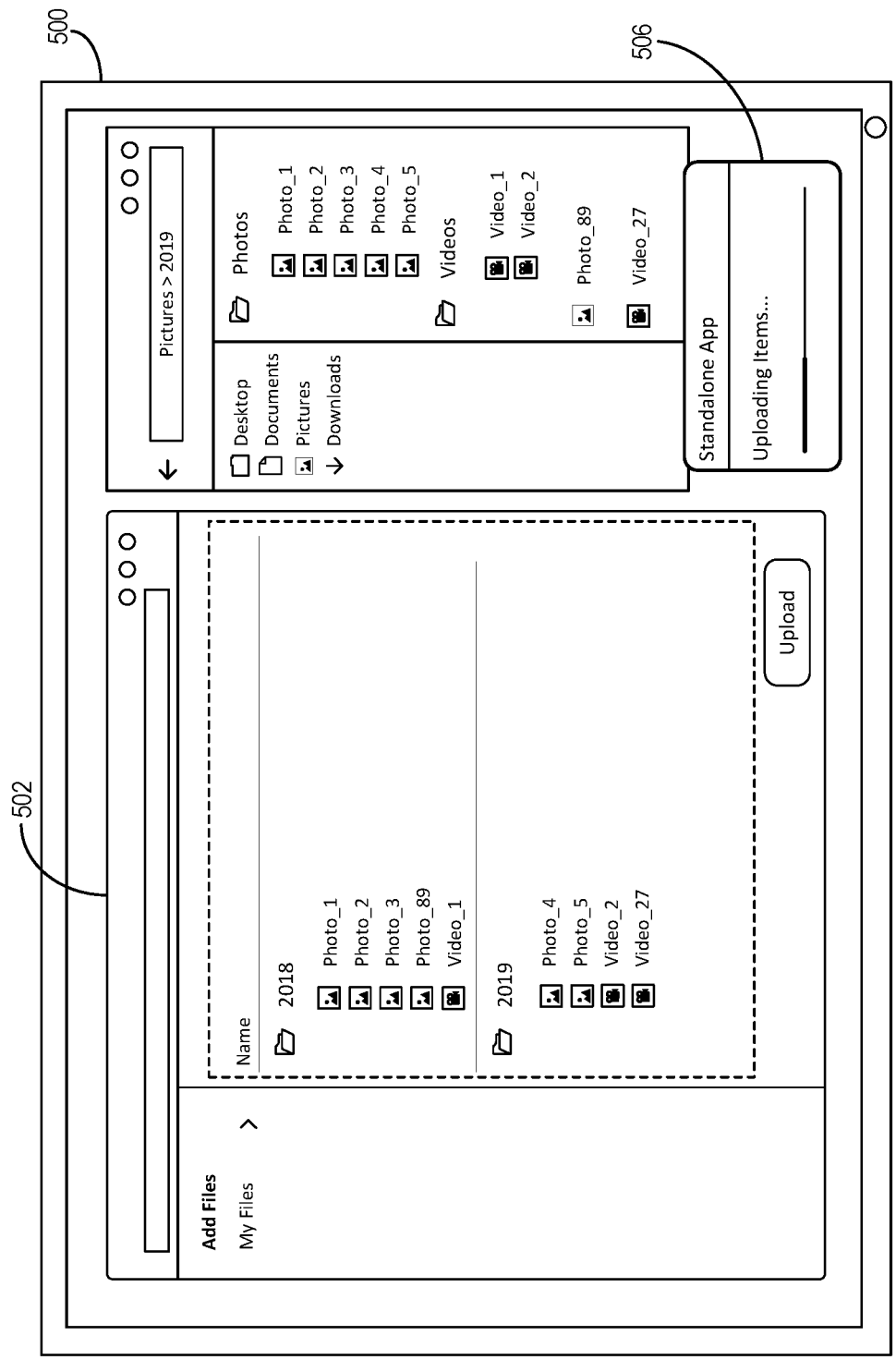

In one or more embodiments, as previously mentioned, the content management system 102 allows a user to begin a process for uploading content using a first application and resume the process using a second application. FIGS. 5A-5B illustrate an embodiment in which a user generates an organizational structure for selected content items using a web application and then uploading the selected content items using a standalone application. In such an embodiment, the content management system 102 can use the organizational structure to accurately resume the upload process and store the content items at the content management system 102 according to the organizational structure.

In particular, FIG. 5A illustrates a client device 500 including a client application 502 that displays a plurality of selected content items. For example, the client application 502 can include a web application that allows the user to access a website associated with the content management system 102. The client application 502 can provide a view of selected content items to be transmitted to the content management system 102 for storage in connection with a user account of the user. Furthermore, the client application 502 can display the content items according to an organizational structure that the user defines using the client application 502.

In one or more embodiments, the client application 502 (or the website associated with the content management system 102) can have limited capability to upload content items to the content management system 102. For example, the client application 502 may not be able to upload content items of one or more file types or of file sizes above a predetermined file size. To illustrate, if one or more content items has a file size greater than a certain size, the client application 502 may be unable to upload the content item(s). Even if the client application 502 does not upload any content items, in one or more embodiments, the client application 502 can send metadata representing the organizational structure to the content management system 102 via the client application 502.

In one or more embodiments, in response to determining that one or more of the content items has a file size greater than the predetermined file size, the content management system 102 can cause the client application 502 to notify the user of the limit. Specifically, FIG. 5A illustrates a notification 504 that indicates that the client application 502 is incapable of uploading one or more of the selected content items. Accordingly, the content management system 102 may pause a current upload of the selected content items, skip the indicated content items, or prevent the user from even initiating an upload of the selected content items due to the content items that are too large. The notification 504 can also indicate to the user that the upload process can begin/resume via a standalone application and can allow the user to select an option to begin/resume the process via the standalone application or cancel the upload process.

In response to the user selecting the option to begin/resume the upload process via the standalone application, the content management system 102 can cause the client device 500 to open or otherwise switch to the standalone application on the client device 500. FIG. 5B illustrates that the client device 500 can display a notification 506 associated with the standalone application. The notification 506 can include an indication that the standalone application is uploading the content items. Specifically, if the client device 500 has already transmitted one or more of the content items to the content management system 102, the notification 506 can indicate that the standalone application is resuming the upload process to finish uploading the remaining content items to the content management system 102. If the client device 500 did not transmit any of the selected content items to the content management system 102 prior to the user selecting to switch to the standalone application, the notification 506 can indicate that the upload process has begun.

After the upload process has begun, the standalone application can run as a background process on the client device 500. Alternatively, the client application 502 can display the standalone application or an indicator of the upload progress on a display device of the client device 500. Furthermore, when the upload process is complete, the content management system 102 can send an electronic message to the client device 500 to cause the client device 500 to display a notification of the upload process completion to the user. In one or more embodiments, if the content management system 102 switches the upload process to a new application (e.g., a standalone application), the content management system 102 can still store the content items according to the previously provided organizational structure.

Although FIGS. 5A-5B illustrate a user creating an organizational structure to be applied to a set of selected content items at the content management system 102 within a web application, the content management system 102 is not limited to allowing users to generate organizational structures at web-based applications and resuming an interrupted upload via a standalone application. For example, the content management system 102 can allow users to generate the organizational structure via the standalone application and then resume the upload process at a web-based application (or other type of application).

Figure 6:
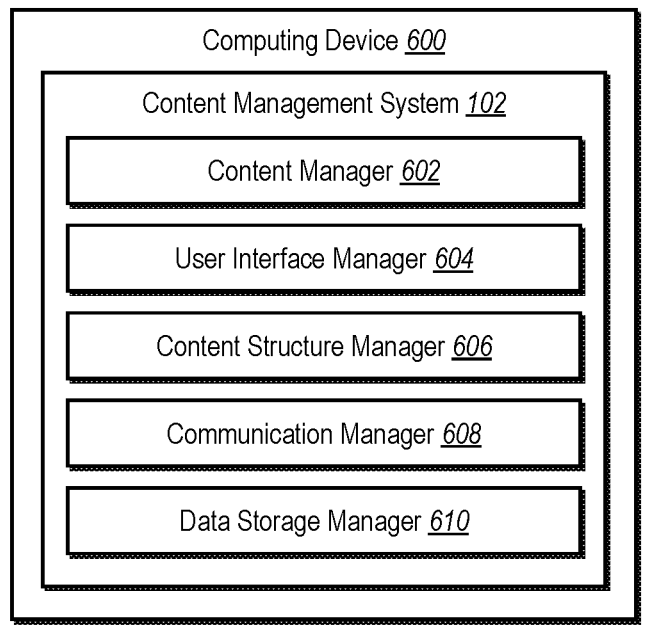
FIG. 6 illustrates a diagram of the content management system in accordance with one or more implementations.

As described in relation to FIGS. 1-5B, the content management system 102 can perform operations for generating a customized organizational structure prior to transmitting content. FIG. 6 illustrates a detailed schematic diagram of an embodiment of the content management system 102 described above. As shown, the content management system 102 can be implemented on computing device(s) 600 (e.g., a client device and/or server device as described in FIG. 1 and as further described below in relation to FIG. 9). Additionally, the content management system 102 can include, but is not limited to, a content manager 602, a user interface manager 604, a content structure manager 606, a communication manager 608, and a data storage manager 610. The content management system 102 can be implemented on any number of computing devices. For example, the content management system 102 can be implemented in a distributed system of server devices for providing content storage to any number of client devices. Alternatively, at least a portion of the content management system 102 (i.e., components that perform the operations associated with generating customized organizational structures and/or transmitting data) can be implemented on a computing device such as a client device running a client application that communicates with a remote storage service.

In one or more embodiments, each of the components of the content management system 102 is in communication with other components using any suitable communication technologies. Additionally, the components of the content management system 102 can be in communication with one or more other devices including other computing devices of a user, server devices (e.g., cloud storage devices), licensing servers, or other devices/systems. It will be recognized that although the components of the content management system 102 are shown to be separate in FIG. 6, any of the subcomponents may be combined into fewer components, such as into a single component, or divided into more components as may serve a particular implementation. Furthermore, although the components of FIG. 6 are described in connection with the content management system 102, at least some of the components for performing operations in conjunction with the content management system 102 described herein may be implemented on other devices within the environment.

The components of the content management system 102 can include software, hardware, or both. For example, the components of the content management system 102 can include one or more instructions stored on a computer-readable storage medium and executable by processors of one or more computing devices (e.g., the computing device(s) 600). When executed by the one or more processors, the computer-executable instructions of the content management system 102 can cause the computing device(s) 600 to perform the customized organizational structure operations described herein. Alternatively, the components of the content management system 102 can include hardware, such as a special purpose processing device to perform a certain function or group of functions. Additionally, or alternatively, the components of the content management system 102 can include a combination of computer-executable instructions and hardware.

Furthermore, the components of the content management system 102 performing the functions described herein with respect to the content management system 102 may, for example, be implemented as part of a stand-alone application, as a module of an application, as a plug-in for applications including web applications, as a library function or functions that may be called by other applications, and/or as a cloud-computing model. Thus, the components of the content management system 102 may be implemented as part of a stand-alone application on a personal computing device or a mobile device.

As mentioned, the content management system 102 of FIG. 6 includes a content manager 602 that facilitates the management of content items. For example, the content manager 602 can manage the locations of content items on a client device and/or remote locations such as internet-based storage locations. The content manager 602 can also manage information about content items such as names or other identifiers, types, file sizes, etc. The content manager 602 can also determine whether certain content items are selected to be uploaded to a remote storage location.

The content management system 102 can also include a user interface manager 604 to facilitate information displayed on a display device. The user interface manager 604 can also facilitate interactions with the information displayed on the display device. To illustrate, the user interface manager 604 can allow a user to view various applications on a client device such as a web application or a standalone application associated with the content management system 102. The user interface manager 604 can also facilitate drag-and-drop (or other selection) operations for selecting content items to upload from a client device to a remote storage device.

The content management system 102 can also include a content structure manager 606 to facilitate customization of organizational structures. To illustrate, the content structure manager 606 can allow a user to generate a customized organizational structure to be used for content items by interacting with a client application to establish an arrangement of folders and/or content items. The content structure manager 606 can also facilitate the creation of metadata representing customized organizational structures for use in storing the content items according to previously generated organizational structures.

Additionally, the content management system 102 can include a communication manager 608 to facilitate the transfer or transmission of data from a client device to a remote storage device. For instance, the communication manager 608 can cause a client device to transmit metadata corresponding to an organizational structure of content items to a remote storage device. The communication manager 608 can also cause the client device to transmit content items to the remote storage device. The communication manager 608 can also allow the user to access previously transmitted content items from the remote storage device.

The content management system 102 also includes a data storage manager 610 (that comprises a non-transitory computer memory and/or memory device) that stores and maintains data associated with remote content storage and organizational structures for content items. For example, the data storage manager 610 can store content items and an organizational structure for the content items. The data storage manager 610 can also store user account information for transmitting and/or synchronizing data in connection with one or more client devices and/or server devices. The data storage manager 610 can be maintained on a local client device of a user or on server devices according to one or more implementations.

Figure 7:
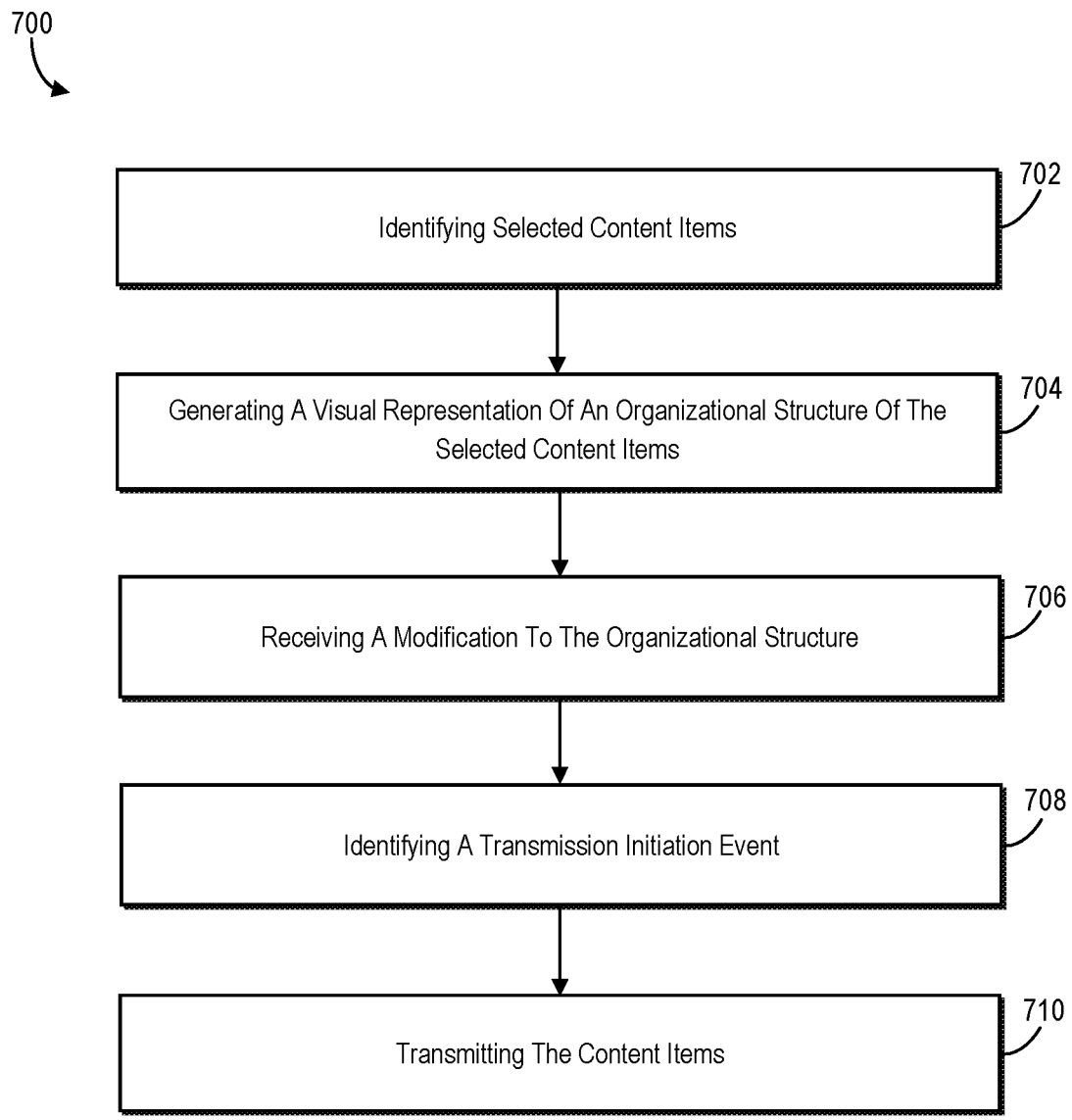
FIG. 7 illustrates a flowchart of a series of acts for generating a customized organizational structure for content items prior to uploading the content items to remote storage in accordance with one or more implementations.

Turning now to FIG. 7, this figure illustrates a flowchart of a series of acts 700 of generating customized organizational structures to be used for content items prior to transmitting the content items. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

The series of acts 700 includes an act 702 of identifying selected content items. For example, act 702 involves identifying a user selection of content items to store on a content management system. Act 702 can involve, for example, identifying a drag-and-drop operation to insert the content items from a file manager application on a client device into a web-based application.

As part of act 702, or as an additional act, the series of acts 700 can include identifying the user selection of the content items within a file manager application displaying a plurality of content items stored on a storage device of the computing device or on a remote third-party content management system. For example, the series of acts 700 can include a user selection of at least one content item stored on a storage device of the computing device and at least one content item stored on the remote third-party content management system.

The series of acts 700 also includes an act 704 of generating a visual representation of an organizational structure of the selected content items. For example, act 704 involves generating a visual representation of an organizational structure of the set of content items to be used for the content items at the content management system, wherein the visual representation is generated prior to transmitting the content items to the content management system. Act 704 can involve generating an initial organizational structure of the set of content items based on a storage structure of the set of content items within the storage device of the computing device or within the remote third-party content management system. Act 704 can also involve generating placeholder icons representing the content items within the web-based application prior to a transmitting the content items to the content management system.

Additionally, the series of acts 700 includes an act 706 of receiving a modification to the organizational structure. For example, act 706 involves receiving, based on user input and prior to transmitting the content items to the content management system, a modification to the organizational structure of the content items to generate a custom organizational structure. Act 706 can involve detecting a user interaction to add, move, or delete a content item of the content items within the organizational structure. Act 706 can also involve generating the custom organizational structure without modifying the storage structure of the content items within the storage device of the computing device and without modifying the storage structure within the remote third-party content management system.

As part of act 706, or as an additional act, the series of acts 700 can include generating, and transmitting to the content management system, metadata representing the custom organizational structure of the content items. Additionally, the series of acts 700 can include transmitting the metadata prior to transmitting the content items to the content management system. The series of acts 700 may alternatively include transmitting the metadata in parallel with transmitting the content items to the content management system.

Furthermore, the series of acts 700 can include determining an additional modification to the custom organizational structure. The series of acts 700 can then include updating the metadata to represent the custom organizational structure with the additional modification. The series of acts 700 can also include transmitting the updated metadata to the content management system.

The series of acts 700 further includes an act 708 of identifying a transmission initiation event. For example, act 708 involves identifying a transmission initiation event to begin transmitting the content items to the content management system. Act 708 can involve detecting a selection of an upload element within a client application used to generate the custom organizational structure.

The series of acts 700 also includes an act 710 of transmitting the content items. For example, act 710 involves, in response to identifying the transmission initiation event, transmitting the content items to the content management system, wherein the transmission of the content items causes the content items to be stored at the content management system according to the custom organizational structure. Act 710 can involve transmitting the content items to the content management system to cause the content management system to store the content items in the custom organizational structure previously transmitted to the content management system.

Furthermore, the series of acts 700 can include determining that the modification to the organizational structure of the content items occurred within a first application. For example, the first application can include a web application comprising a web-based online interface. The series of acts 700 can include receiving a request to transmit the content items to the content management system using a second application separate from the first application. For example, the second application can include a standalone application comprising a standalone application interface. The series of acts 700 can then include transmitting, using the second application, the content items to the content management system.

In one or more embodiments, the series of acts 700 includes detecting an interruption of a transmission of the content items to the content management system. For example, the series of acts 700 can include determining that one or more content items of the content items cannot be uploaded via the web-based online interface. The series of acts 700 can include providing, for display on a display device, a notification that the one or more content items of the content items cannot be uploaded via a web-based online interface. The series of acts 700 can then include receiving a request to switch to a standalone application interface to upload the content items to the content management system.

Figure 8:
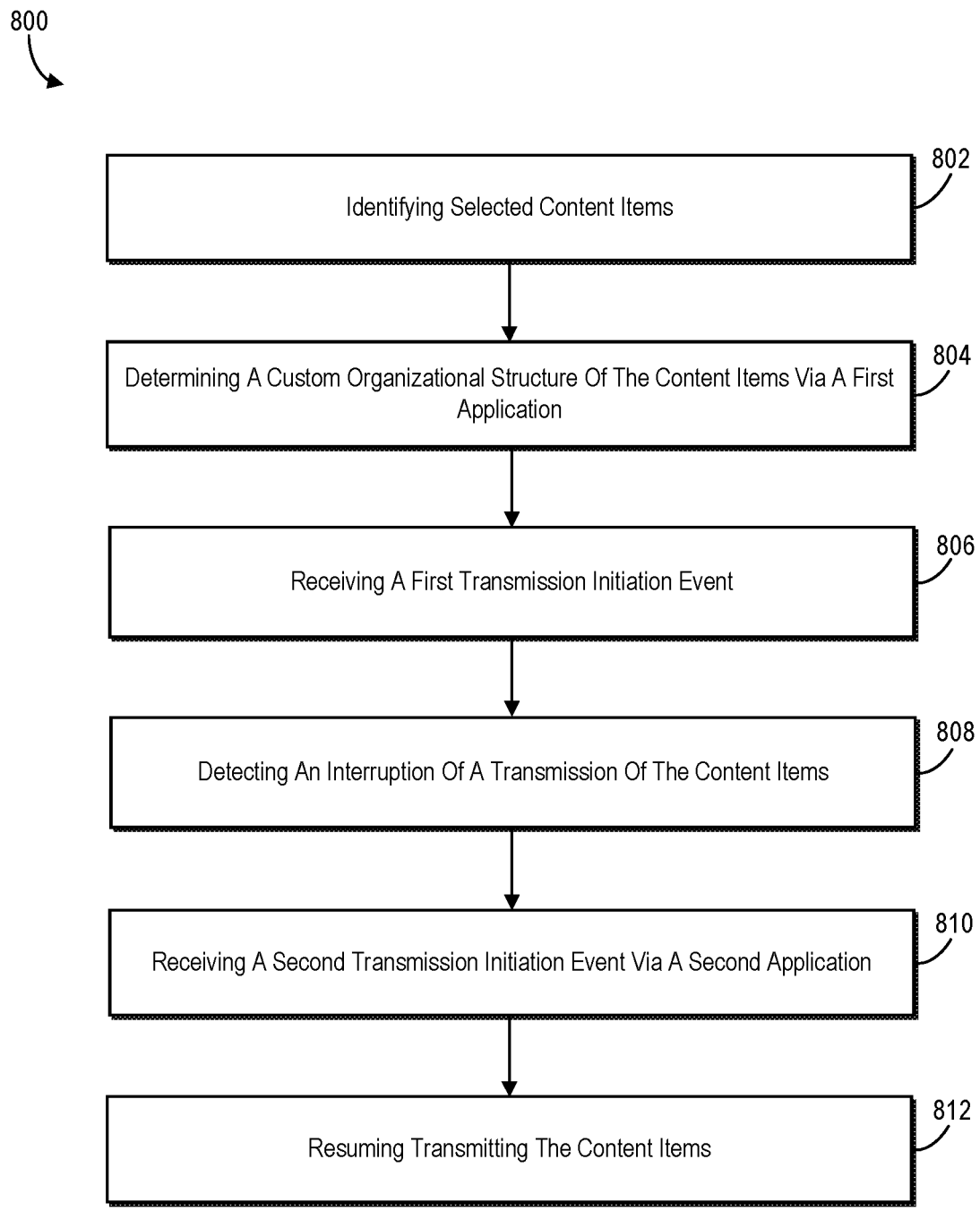
FIG. 8 illustrates a flowchart of another series of acts for generating a customized organizational structure for content items prior to uploading the content items to remote storage in accordance with one or more implementations.

Turning now to FIG. 8, this figure illustrates a flowchart of a series of acts 800 of generating customized organizational structures to be used for content items prior to transmitting the content items. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

The series of acts 800 includes an act 802 of identifying selected content items. For example, act 802 involves identifying a user selection of content items to store on a content management system. Act 802 can involve, for example, identifying a drag-and-drop operation to insert the content items from a file manager application on a client device into a web-based application.

The series of acts 800 includes an act 804 of determining a custom organizational structure of the content items via a first application. For example, act 804 involves determining a custom organizational structure of the content items via a web-based online interface prior to transmitting the content items to the content management system.

As part of act 804, or as an additional act, the series of acts 800 can include generating metadata representing the custom organizational structure of the content items. Additionally, the series of acts 800 can include transmitting the metadata prior to transmitting the content items to the content management system. The series of acts 800 can also include detecting, via the web-based online interface, one or more user interactions modifying a content item or a folder within an organizational structure of the content items.

The series of acts 800 also includes an act 806 of receiving a first transmission initiation event. For example, act 806 involves receiving, via the web-based online interface, a first transmission initiation event to begin transmitting the content items to the content management system, wherein the transmission of the content items cause the content items to be stored at the content management system according to the custom organizational structure.

Additionally, the series of acts 800 includes an act 808 of detecting an interruption of a transmission of the content items. For example, act 808 involves detecting an interruption of a transmission of the content items to the content management system. Act 808 can involve, for example, determining that one or more content items of the content items cannot be uploaded via the web-based online interface. For example, act 808 can involve determining that a size or file type of a content item is not compatible with transmitting via the web-based online interface. Act 808 can also involve providing, for display on a display device, a notification that the one or more content items of the content items cannot be uploaded via the web-based online interface.

The series of acts 800 also includes an act 810 of receiving a second transmission initiation event via a second application. For example, act 810 involves receiving, after detecting the interruption and via a standalone application interface, a second transmission initiation event to resume transmitting the content items to the content management system. Act 810 can involve receiving a request to switch to the standalone application interface to upload the content items to the content management system.

Furthermore, the series of acts 800 includes an act 812 of resuming transmitting the content items. For example, act 812 involves resuming, in response to the second transmission initiation event, transmitting the content items to the content management system, wherein the resumed transmission of the content items causes the content items to be stored at the content management system according to the custom organizational structure previously provided to the content management system.

Furthermore, the series of acts 800 can include determining an additional modification to the custom organizational structure. The series of acts 800 can then include updating the metadata to represent the custom organizational structure with the additional modification. The series of acts 800 can also include transmitting the updated metadata to the content management system.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

A processor can include any processing unit or device that processes instructions in a computing system. For example, a processor can include, but is not limited to, one or more of a central processing unit, a graphics processing unit, a field programmable gate array, an accelerated processing unit, a digital signal processor, or an integrated processor. A computing system can also include any number of processors for processing individually (e.g., by a single processor) or together (e.g., by a plurality of different processors or processor cores).

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
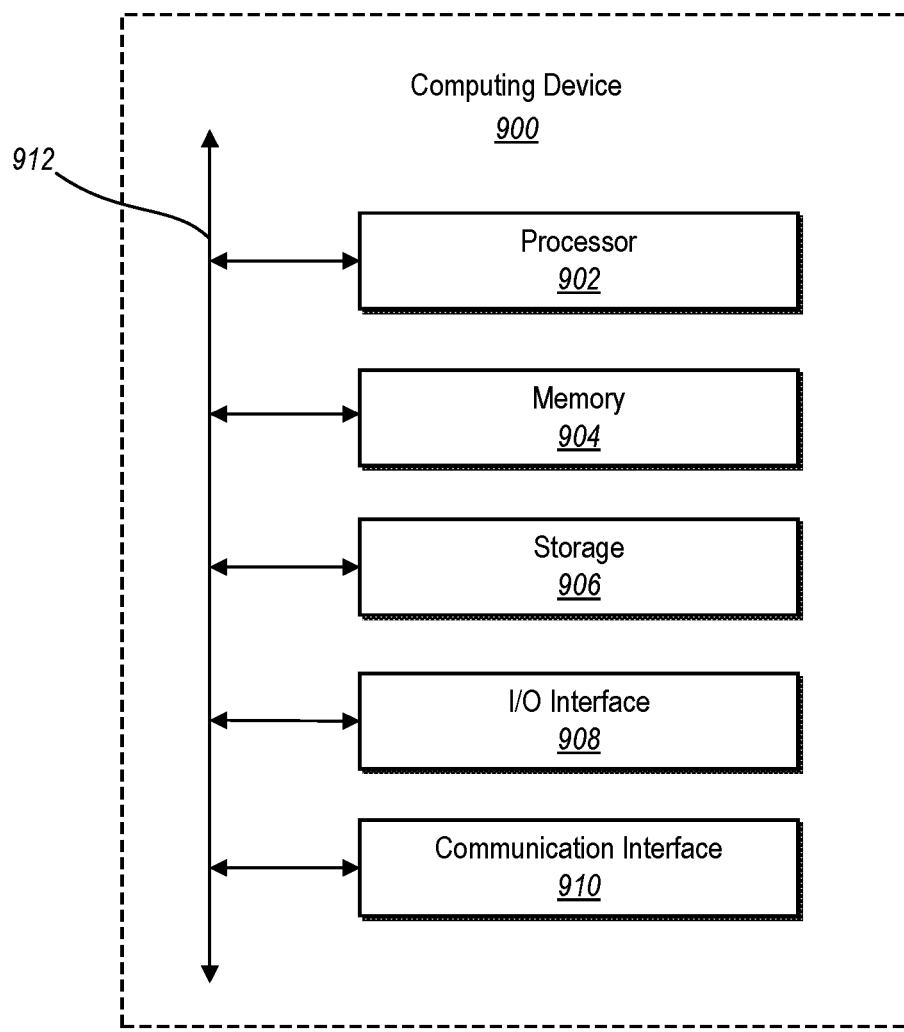
FIG. 9 illustrates a block diagram of a computing device in accordance with one or more embodiments.

FIG. 9 illustrates a block diagram of exemplary computing device 900 that may be configured to perform one or more of the processes described above. One will appreciate that client devices described herein and/or the content management system 102 may comprise one or more computing devices such as computing device 900. As shown by FIG. 9, computing device 900 can comprise processor 902, memory 904, storage device 906, I/O interface 908, and communication interface 910, which may be communicatively coupled by way of communication infrastructure 912. While an exemplary computing device 900 is shown in FIG. 9, the components illustrated in FIG. 9 are not intended to be limiting. Additional or alternative components may be used in other embodiments. Furthermore, in certain embodiments, computing device 900 can include fewer components than those shown in FIG. 9. Components of computing device 900 shown in FIG. 9 will now be described in additional detail.

In particular embodiments, processor 902 includes hardware for executing instructions, such as those making up a computer program. As an example, and not by way of limitation, to execute instructions, processor 902 may retrieve (or fetch) the instructions from an internal register, an internal cache, memory 904, or storage device 906 and decode and execute them. In particular embodiments, processor 902 may include one or more internal caches for data, instructions, or addresses. As an example and not by way of limitation, processor 902 may include one or more instruction caches, one or more data caches, and one or more translation lookaside buffers (TLBs). Instructions in the instruction caches may be copies of instructions in memory 904 or storage 906. Additionally, processor 902 can include or represent one or more processors or processor cores.

Memory 904 may be used for storing data, metadata, and programs for execution by the processor(s). Memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 904 may be internal or distributed memory.

Storage device 906 includes storage for storing data or instructions. As an example and not by way of limitation, storage device 906 can comprise a non-transitory storage medium described above. Storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to computing device 900. In particular embodiments, storage device 906 is non-volatile, solid-state memory. In other embodiments, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 908 allows a user to provide input to, receive output from, and otherwise transfer data to and receive data from computing device 900. I/O interface 908 may include a mouse, a keypad or a keyboard, a touch screen, a camera, an optical scanner, network interface, modem, other known I/O devices or a combination of such I/O interfaces. I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 908 is configured to provide graphical data to a display for presentation to a user. The graphical data may be representative of one or more graphical user interfaces and/or any other graphical content as may serve a particular implementation.

Communication interface 910 can include hardware, software, or both. In any event, communication interface 910 can provide one or more interfaces for communication (such as, for example, packet-based communication) between computing device 900 and one or more other computing devices or networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MIMS"), radio frequency ("RF") signaling technologies, Long Term Evolution ("LTE") technologies, wireless communication technologies, in-band and out-of-band signaling technologies, and other suitable communications networks and technologies.

Communication infrastructure 912 may include hardware, software, or both that couples components of computing device 900 to each other. As an example and not by way of limitation, communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
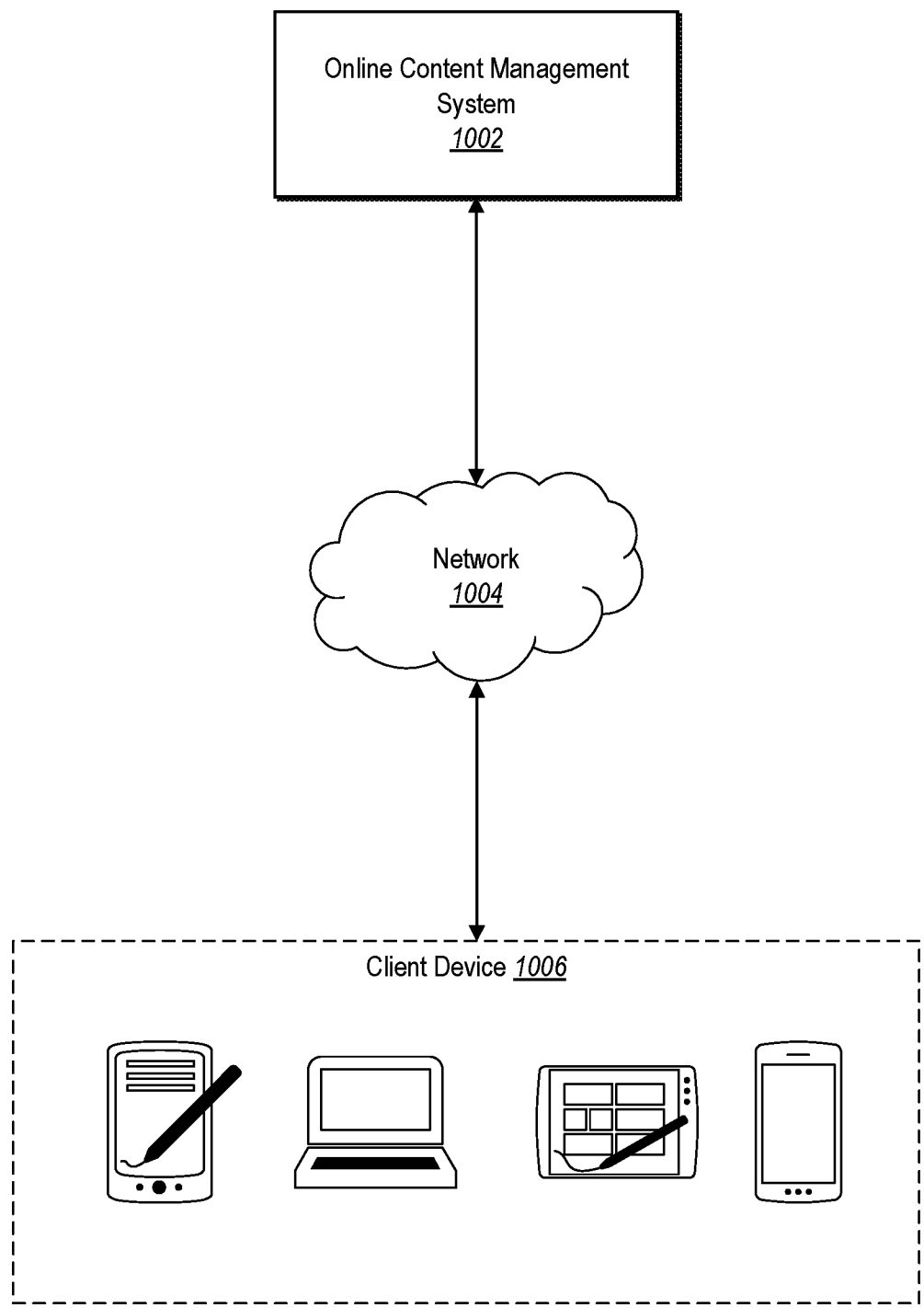
FIG. 10 illustrates a networking environment of a content management system in accordance with one or more embodiments.

FIG. 10 is a schematic diagram illustrating an environment within which one or more embodiments of system 102 can be implemented. Content management system 1002 may generate, store, manage, receive, and send digital content (such as digital videos). For example, content management system 1002 may send and receive digital content to and from client devices 1006 by way of network 1004. In particular, content management system 1002 can store and manage a collection of digital content. Content management system 1002 can manage the sharing of digital content between computing devices associated with a plurality of users. For instance, content management system 1002 can facilitate a user sharing a digital content with another user of content management system 1002.

In particular, content management system 1002 can manage synchronizing digital content across multiple client devices 1006 associated with one or more users. For example, a user may edit digital content using client device 1006. The content management system 1002 can cause client device 1006 to send the edited digital content to content management system 1002. Content management system 1002 then synchronizes the edited digital content on one or more additional computing devices.

In addition to synchronizing digital content across multiple devices, one or more embodiments of content management system 1002 can provide an efficient storage option for users that have large collections of digital content. For example, content management system 1002 can store a collection of digital content on content management system 1002, while the client device 1006 only stores reduced-sized versions of the digital content. A user can navigate and browse the reduced-sized versions (e.g., a thumbnail of a digital image) of the digital content on client device 1006. In particular, one way in which a user can experience digital content is to browse the reduced-sized versions of the digital content on client device 1006.

Another way in which a user can experience digital content is to select a reduced-size version of digital content to request the full- or high-resolution version of digital content from content management system 1002. In particular, upon a user selecting a reduced-sized version of digital content, client device 1006 sends a request to content management system 1002 requesting the digital content associated with the reduced-sized version of the digital content. Content management system 1002 can respond to the request by sending the digital content to client device 1006. Client device 1006, upon receiving the digital content, can then present the digital content to the user. In this way, a user can have access to large collections of digital content while minimizing the amount of resources used on client device 1006.

Client device 1006 may be a desktop computer, a laptop computer, a tablet computer, a personal digital assistant (PDA), an in- or out-of-car navigation system, a smart TV, a virtual reality (VR) or augmented reality (AR) device, a handheld device, a wearable device, a smartphone or other cellular or mobile phone, or a mobile gaming device, other mobile device, or other suitable computing devices. Client device 1006 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1004.

Network 1004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1006 may access content management system 1002.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause at least one computing device to:

identify a user selection of content items stored at a client device to store on a content management system remote from the client device;

generate a visual representation of an organizational structure of the content items to be used for generating a file hierarchy for the content items on one or more storage devices at the content management system, wherein the visual representation is generated prior to transmitting the content items to the content management system and comprises placeholder icons pointing to the content items stored at the client device;

receive, based on user input via the visual representation and prior to transmitting the content items from the client device to the content management system, a modification to the organizational structure of the content items indicated by movement of a placeholder of a content item or a folder from a first position to a second position within the organizational structure to generate a custom organizational structure indicating a custom file hierarchy of the content items;

identify a transmission initiation event to begin transmitting the content items from the client device via a network to the content management system; and in response to identifying the transmission initiation event, transmit the content items from the client device to the content management system, wherein the transmission of the content items causes the content management system to generate the custom file hierarchy of the custom organizational structure and store the content items at the one or more storage devices of the content management system according to metadata representing the custom file hierarchy.

2. The non-transitory computer readable storage medium as recited in claim 1, wherein the instructions that, when executed by the at least one processor, cause the at least one computing device to identify the user selection of the content items further cause the at least one computing device to identify the user selection of the content items within a file manager application displaying a plurality of content items stored on a storage device of the client device or on a remote third-party content management system.

3. The non-transitory computer readable storage medium as recited in claim 2, wherein the instructions that, when executed by the at least one processor, cause the at least one computing device to generate the visual representation of the organizational structure of the content items to be used for generating a file hierarchy for the content items on the one or more storage devices at the content management system further cause the at least one computing device to generate an initial organizational structure of the content items based on a storage structure of the content items within the storage device of the client device or within the remote third-party content management system.

4. The non-transitory computer readable storage medium as recited in claim 3, wherein the instructions that, when executed by the at least one processor, cause the at least one computing device to receive the modification to the organizational structure of the content items further cause the at least one computing device to generate the custom organizational structure without modifying the storage structure of the content items within the storage device of the client device and without modifying the storage structure within the remote third-party content management system.

5. The non-transitory computer readable storage medium as recited in claim 1, wherein the instructions that, when executed by the at least one processor, cause the at least one computing device to receive the modification to the organizational structure of the content items further cause the at least one computing device to detect a user interaction to add, move, or delete a content item within the organizational structure.

6. The non-transitory computer readable storage medium as recited in claim 1, further comprising instructions that, when executed by the at least one processor, cause the at least one computing device to generate, and transmit to the content management system, the metadata representing the custom organizational structure of the content items.

7. The non-transitory computer readable storage medium as recited in claim 6, wherein the instructions that, when executed by the at least one processor, cause the at least one computing device to transmit the metadata further cause the at least one computing device to transmit the metadata to the content management system prior to transmitting the content items to the content management system.

8. The non-transitory computer readable storage medium as recited in claim 7, further comprising instructions that, when executed by the at least one processor, cause the at least one computing device to:
  determine an additional modification to the custom organizational structure;
  update the metadata to represent the custom organizational structure with the additional modification; and
  transmit the updated metadata to the content management system.

9. The non-transitory computer readable storage medium as recited in claim 1, further comprising instructions that, when executed by the at least one processor, cause the at least one computing device to:
  determine that the modification to the organizational structure of the content items occurred within a first application;
  receive a request to transmit the content items from the client device to the content management system using a second application separate from the first application; and
  transmit, using the second application, the content items from the client device to the content management system.

10. A system comprising:
  at least one processor; and
  a non-transitory computer readable storage medium comprising instructions that, when executed by the at least one processor, cause the system to:
    identify a user selection of a content items stored at a client device to store on a content management system remote from the client device;
    generate a visual representation of an organizational structure of the content items to be used for generating a file hierarchy for the content items on one or more storage devices at the content management system, wherein the visual representation is generated prior to transmitting the content items to the content management system and comprises placeholder icons pointing to the content items stored at the client device;
    receive, based on user input via the visual representation and prior to transmitting the content items from the client device to the content management system, a modification to the organizational structure of the content items indicated by movement a placeholder of a content item or a folder from a first position to a second position within the organizational structure to generate a custom organizational structure indicating a custom file hierarchy of the content items;
    identify a transmission initiation event to begin transmitting the content items from the client device via a network to the content management system; and
    in response to identifying the transmission initiation event, transmit the content items from the client device to the content management system, wherein the transmission of the content items causes the content management system to generate the custom file hierarchy of the custom organizational structure and store the content items at the one or more storage devices of the content management system according to metadata representing the custom file hierarchy.

11. The system as recited in claim 10, wherein the instructions that, when executed by the at least one processor, cause the system to identify the user selection of the content items further cause the system to identify the user selection of the content items within a file manager application displaying a plurality of content items stored on a storage device of the client device or on a remote third-party content management system.

12. The system as recited in claim 10, wherein the instructions that, when executed by the at least one processor, cause the system to receive the modification to the organizational structure of the content items further cause the system to detect a user interaction to add, move, or delete a content item within the organizational structure.

13. The system as recited in claim 10, further comprising instructions that, when executed by the at least one processor, cause the system to:
  generate, and transmit to the content management system, the metadata representing the custom file hierarchy indicated by the custom organizational structure of the content items; and
  wherein the instructions that, when executed by the at least one processor, cause the system to transmit the metadata cause the system to transmit the metadata in parallel with transmitting the content items to the content management system.

14. The system as recited in claim 10, further comprising instructions that, when executed by the at least one processor, cause the system to:
  generate, and transmit to the content management system, the metadata representing the custom file hierarchy indicated by the custom organizational structure of the content items; and
  wherein the instructions that, when executed by the at least one processor, cause the system to transmit the metadata cause the system to transmit the metadata prior to transmitting the content items to the content management system.

15. The system as recited in claim 10, further comprising instructions that, when executed by the at least one processor, cause the system to:
  determine that the modification to the organizational structure of the content items occurred within a first application;
  receive a request to transmit the content items from the client device to the content management system using a second application separate from the first application; and
  transmit, using the second application, the content items from the client device to the content management system.

16. A computer-implemented method comprising:
identifying a user selection of content items stored at a client device to store on a content management system remote from the client device;
generating a visual representation of an organizational structure of the content items to be used for generating a file hierarchy for the content items on one or more storage devices at the content management system, wherein the visual representation is generated prior to transmitting the content items to the content management system and comprises placeholder icons pointing to the content items stored at the client device;
receiving, based on user input via the visual representation and prior to transmitting the content items from the client device to the content management system, a modification to the organizational structure of the content items indicated by movement a placeholder of a content item or a folder from a first position to a second position within the organizational structure to generate a custom organizational structure indicating a custom file hierarchy of the content items;
identifying a transmission initiation event to begin transmitting the content items from the client device via a network to the content management system; and
in response to identifying the transmission initiation event, transmitting the content items from the client device to the content management system, wherein the transmission of the content items causes the content management system to generate the custom file hierarchy of the custom organizational structure and store the content items at the one or more storage devices of the content management system according to metadata representing the custom file hierarchy.

17. The computer-implemented method as recited in claim 16, further comprising:
determining that the modification to the organizational structure of the content items occurred within a first application;
receiving a request to transmit the content items from the client device to the content management system using a second application separate from the first application; and
transmitting, using the second application, the content items from the client device to the content management system.

18. The computer-implemented method as recited in claim 16, wherein generating the visual representation of the organizational structure of the content items to be used for the content items at the content management system comprises generating an initial organizational structure of the content items based on a storage structure of the content items within the storage device of the client device or within a remote third-party content management system.

19. The computer-implemented method as recited in claim 16, further comprising:
detecting an interruption of a transmission of the content items from the client device to the content management system;
receiving an additional transmission event to resume transmitting the content items to the content management system; and
resuming, in response to the additional transmission event, transmitting the content items from the client device to the content management system according to the custom organizational structure indicating the custom file hierarchy of the content items previously provided to the content management system.

20. The computer-implemented method as recited in claim 19, wherein the transmission initiation event to begin transmitting the content items from the client device to the content management system occurs within a web-based online interface and the additional transmission event to resume transmitting the content items to the content management system occurs within a standalone application interface.

* * * * *